(12) United States Patent
Shinotsuka et al.

(10) Patent No.: US 11,635,516 B2
(45) Date of Patent: Apr. 25, 2023

(54) DETECTION DEVICE, DETECTION SYSTEM AND DETECTION METHOD

(71) Applicant: Ricoh Company, Ltd., Tokyo (JP)

(72) Inventors: Michiaki Shinotsuka, Kanagawa (JP); Syuji Kubota, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 136 days.

(21) Appl. No.: 17/182,374

(22) Filed: Feb. 23, 2021

(65) Prior Publication Data

US 2021/0293955 A1    Sep. 23, 2021

(30) Foreign Application Priority Data

Mar. 18, 2020   (JP) .............................. JP2020-047279

(51) Int. Cl.
   *G01S 17/04*    (2020.01)

(52) U.S. Cl.
   CPC .................................... *G01S 17/04* (2020.01)

(58) Field of Classification Search
   CPC ....................................................... G01S 17/04
   See application file for complete search history.

(56) References Cited

U.S. PATENT DOCUMENTS

| | | | | |
|---|---|---|---|---|
| 2003/0081411 A1* | 5/2003 | Noda | ...................... | B60Q 3/275 |
| | | | | 362/280 |
| 2005/0190055 A1* | 9/2005 | Petite | ...................... | G08B 17/10 |
| | | | | 340/506 |
| 2018/0288389 A1* | 10/2018 | Kirmani | ..................... | G06T 7/70 |
| 2020/0281512 A1* | 9/2020 | Grubb | ..................... | A61B 5/489 |

FOREIGN PATENT DOCUMENTS

JP    2008-298627    12/2008

\* cited by examiner

*Primary Examiner* — David P Porta
*Assistant Examiner* — Mamadou Faye
(74) *Attorney, Agent, or Firm* — Xsensus LLP

(57) ABSTRACT

A detection device configured to detect an object includes a first light source configured to emit infrared as first light in a first direction, a second light source configured to emit second light in a second direction different from the first direction, a shield to shield a portion of an optical path from the second light source, to allow a portion of the second light to pass, a light-receiving device configured to receive the first light reflected from the object and the portion of the second light reflected from the object, and circuitry configured to detect presence or absence of the object based on reception of reflected light by the detector. The second light is different from the first light.

9 Claims, 25 Drawing Sheets

FIG. 5

| | GLASS | ACRYLIC RESIN | POLYCARBONATE | VINYL CHLORIDE RESIN | HARD VINYL CHLORIDE RESIN |
|---|---|---|---|---|---|
| TRANSMITTANCE (%) | 92 | 92 | 89 | 85 | 73 |
| REFRACTIVE INDEX | 1.52 | 1.49 | 1.59 | 1.53 | 1.53 |

FIG. 6

| | ACRYLIC RESIN | | | | | VINYL CHLORIDE RESIN | PAPER | CORRUGATED CARDBOARD |
|---|---|---|---|---|---|---|---|---|
| COLOR OF CONTAINER | WHITE | YELLOW | GREEN | BLUE | BLACK | BLACK | WHITE | LIGHT BROWN |
| INFRARED REACTION | YES | YES | YES | YES | NO | NO | YES | YES |
| INFRARED REFLECTANCE (%) | 13.8 | 9.2 | 4.6 | 5.5 | 1.8 | 1.6 | 14.7 | 13.8 |
| LED REFLECTANCE (%) | 9.6 | 6.4 | 3.2 | 3.8 | 2.3 | 1.8 | 11.4 | 10.3 |

| θ :ANGLE (°) | 0 | 10 | 20 | 25 | 26~29 | 30 | 40 | 50 | 60 | 70 | 80 |
|---|---|---|---|---|---|---|---|---|---|---|---|
| INFRARED REACTION | YES | YES | YES | YES | UNSTABLE | NO | NO | NO | NO | NO | NO |

FIG. 11A

| DETECTABLE DISTANCE (cm) | 0 | 1 | 2 | 3 | 4 | 5 | 6 | 7 | 8 | 9 | 10 | 11 | 12 |
|---|---|---|---|---|---|---|---|---|---|---|---|---|---|
| INFRARED REACTION | YES | YES | YES | YES | YES | YES | YES | YES | YES | YES | YES | NO | NO |

FIG. 11B

| DETECTABLE DISTANCE (cm) | 0 | 1 | 2 | 3 | 4 | 5 |
|---|---|---|---|---|---|---|
| INFRARED REACTION | YES | YES | YES (UNSTABLE) | NO | NO | NO |

FIG. 11C

| DETECTABLE DISTANCE (cm) | 0 | 1 | 2 | 3 | 4 | 5 | 6 |
|---|---|---|---|---|---|---|---|
| INFRARED REACTION | YES | YES | YES | YES | YES | NO | NO |

FIG. 27

| DEVICE ID | DETECTION | DEVICE POSITION | DETECTION DATE AND TIME |
|---|---|---|---|
| 1a1 | NO | 1F - SOUTH | - |
| 1a2 | PRESENT | 1F - NORTH | 2018/06/11 - 22:35 |
| ... | ... | ... | ... |
| 1ai | NO | 1F - EAST | - |
| 1b1 | PRESENT | 2F - SOUTH | 2018/06/12 - 3:29 |
| 1b2 | NO | 2F - NORTH | - |
| ... | ... | ... | ... |
| 1bj | NO | 2F - WEST | - |
| 1c1 | PRESENT | 3F - SOUTH 1 | 2018/06/13 - 19:02 |
| 1c2 | PRESENT | 3F - SOUTH 2 | 2018/06/13 - 20:07 |
| 1c3 | PRESENT | 3F - SOUTH 3 | 2018/06/13 - 19:30 |
| 1c4 | NO | 3F - NORTH | - |
| ... | ... | ... | ... |
| 1ck | NO | 3F - EAST | - |
| 1d1 | NO | 4F - SOUTH | - |
| 1d2 | NO | 4F - NORTH | - |
| ... | ... | ... | ... |
| 1dm | NO | 4F - WEST | - |

DETECTION DEVICE, DETECTION SYSTEM AND DETECTION METHOD

CROSS-REFERENCE TO RELATED APPLICATION

This patent application is based on and claims priority pursuant to 35 U.S.C. § 119(a) to Japanese Patent Application No. 2020-047279, filed on Mar. 18, 2020, in the Japan Patent Office, the entire disclosure of which is hereby incorporated by reference herein.

BACKGROUND

Technical Field

The present disclosure relates to a detection device, a detection system, and a method for detecting an object.

Related Art

As a technique for detecting an object, there is known a technique including emitting infrared (also called infrared light) and detecting an object such as dirt adhering to a transmissive window based on changes in the reflected light of the infrared.

SUMMARY

An embodiment of this disclosure provides a detection device configured to detect an object. The detection device includes a first light source configured to emit infrared as first light in a first direction, a second light source configured to emit second light in a second direction different from the first direction, a shield disposed to shield a portion of an optical path from the second light source to allow a portion of the second light to pass, a light-receiving device configured to receive the first light reflected from the object and the portion of the second light reflected from the object, and circuitry. The second light is different from the first light. The circuitry detects presence or absence of the object based on reception of reflected light by the detector.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is a table illustrating infrared transmittances and refractive indexes of materials;

FIG. 6 is a diagram illustrating the reflectance of infrared and LED light of example materials and colors;

FIGS. 11A, 11B, and 11C are diagrams illustrating a detectable distance of light depending on the wavelength of the light;

FIG. 27 is a diagram illustrating an example of aggregated data;

Figure 1:
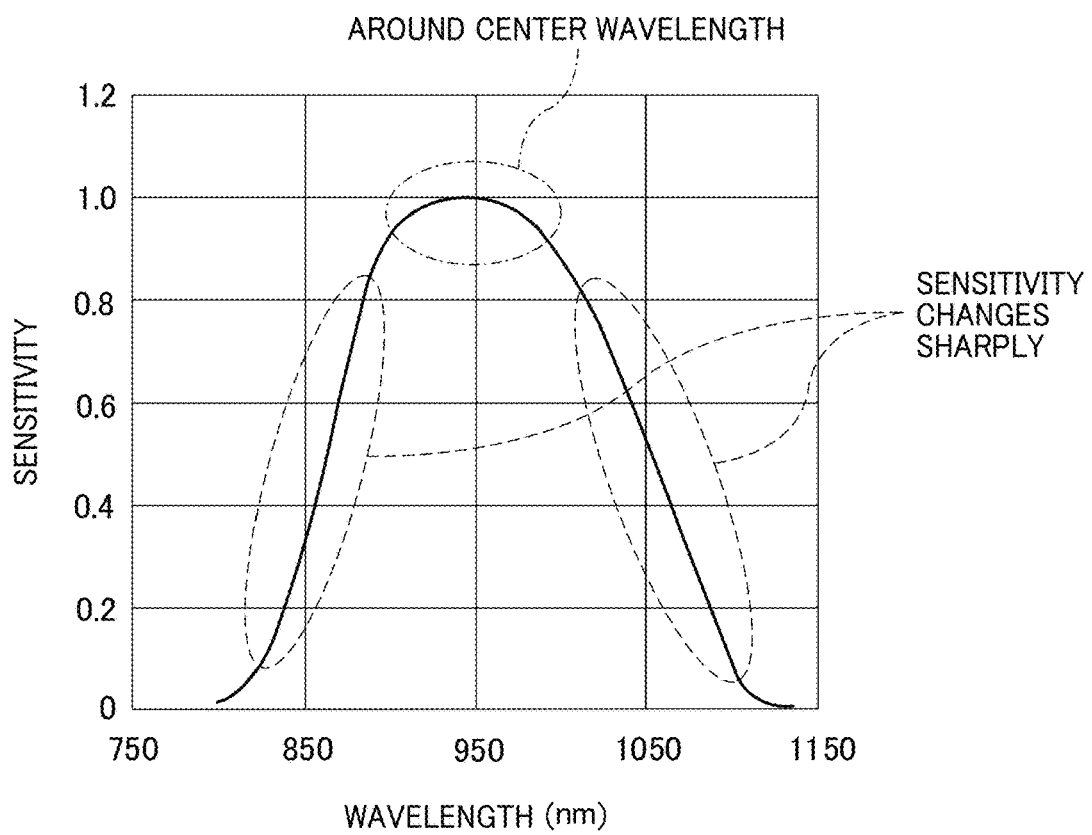
FIG. 1 is a graph illustrating a relationship between a wavelength of an infrared-emitting element and a relative sensitivity.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring to the drawings, embodiments of the present disclosure are described below. As used herein, the singular forms "a," "an," and "the" are intended to include the plural forms as well, unless the context clearly indicates otherwise.

The present embodiment provides a detection device that detects an object (a detection target) on a transparent substrate using infrared having a wavelength of 780 nm or higher and light having a wavelength different from the wavelength of infrared. The detection device can keep sensing the object on the transparent substrate so as to detect placing of the object on the transparent substrate and disappearance of the object from the transparent substrate. In the present embodiment, examples of the object to be detected (the detection target) include a bait for a small animal such as a mouse. The detection target is not limited thereto but may be a key, a valuable item, or the like.

The detection device has two light sources: a light source to emit infrared; and a light source to emit light having a wavelength different from the wavelength of infrared. The detection device emits the light to an object on the transparent substrate, receives the light reflected from the object, and detects the presence or absence of the object based on the changes of the reflected light. The light having a wavelength different from the wavelength of infrared is, for example, visible light having a wavelength of 380 nm to 780 nm, and includes light emitting diode (LED) light.

When an object receives light energy from infrared or LED light, molecules and atoms that construct the object vibrate (thermal motion), and friction between the molecules and atoms generate heat, raising the temperature of the object. The energy of light is luminous energy. Luminous intensity is represented by the amount of luminous flux in candelas per unit solid angle of light emitted from a light source, and is used as an index of the brightness of a point light source. In a thermal equilibrium state where the temperature is constant, even when light energy is incident, the energy is not absorbed. When an object does not transmit the light, the light is reflected. The detection device receives such reflected light and detects the object.

A description is given below of characteristics of infrared used in embodiments, with reference to FIG. 1. FIG. 1 is a graph illustrating the relationship between the wavelength of an infrared-emitting element and the relative sensitivity (relative intensity). A center wavelength of the infrared-emitting element is 950 nm, at which the sensitivity is highest. The relative sensitivity is normalized with the sensitivity at the maximum sensitivity wavelength set to 100. In the wavelength range of 800 nm or smaller, the wavelength range of 1100 nm or greater, and the wavelength range around the central wavelength of 900 to 1000 nm (indicated by alternate long and short dashed lines), when the wavelength changes, changes in sensitivity are small. That is, the changes in sensitivity are gentle. On the other hand, in the wavelength range of 800 to 900 nm and the wavelength range of 1000 to 1100 nm (indicated by broken lines), the sensitivity changes significantly even with a slight wavelength change.

When an object is detected using the wavelength range of 800 to 900 nm or the wavelength range of 1000 to 1100 nm in which the sensitivity changes sharply, the sensitivity changes significantly with a slight wavelength change. Then, detection is unstable. That is, the object is detected in some cases and not detected in some cases.

Therefore, desirably, infrared to be emitted is adjusted to have a wavelength with which the sensitivity is stable, that is, the range near the center wavelength (900 to 1000 nm), the range of 800 nm or lower, or the range of 1100 nm or higher.

However, when the wavelength of 800 nm or smaller or the wavelength of 1100 nm or greater is used, the sensitivity may be low, and the object may not be detected. On the other hand, when the wavelength of 900 to 1000 nm near the center wavelength is used, the sensitivity is so high that the following inconvenience may occur. In a case where there is no object (detection target) on the transparent substrate, the detection device may erroneously detect, via the transparent substrate, a nontarget object located away from the transparent substrate. Examples of nontarget object include walls and ceilings. In this case, detection of the object to be detected is not reliable.

A description is given below of the directivity of light with reference to FIG. 2. Directivity is a property that the intensity of output light differs depending on the direction. A direction-independent property is isotropy. Isotropy is defined as being high when the angle at which the light output becomes half of the peak value (full width at half maximum) is larger than ±25 degrees.

Figure 2:
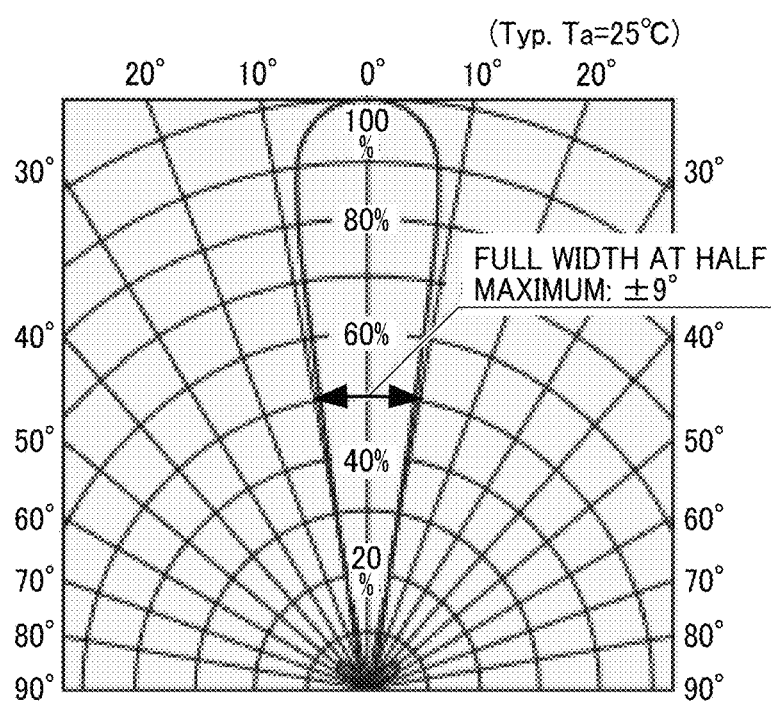
FIG. 2 is a chart illustrating an example of a light emitting diode (LED) output angle.

FIG. 2 is a diagram illustrating an example of LED output angle. LED light, which is as an example of light adopted, has high directivity and has a full width at half maximum of ±9°. When the light having the full width at half maximum of ±9° is directed to the transparent substrate, the LED light and infrared reach a position at a distance of about 30 centimeters through the transparent substrate, and the reflected light can be received.

In detecting an object placed on the transparent substrate, when infrared and LED light reach a position at 30 centimeters from the transparent substrate, a nontarget object at the position 30 centimeters will be detected. Thus, erroneous detection increases.

One cause of such an inconvenience is the high directivity. Lowering the directivity would be an approach to enable reliably detection of the target object to be detected.

Figure 3:
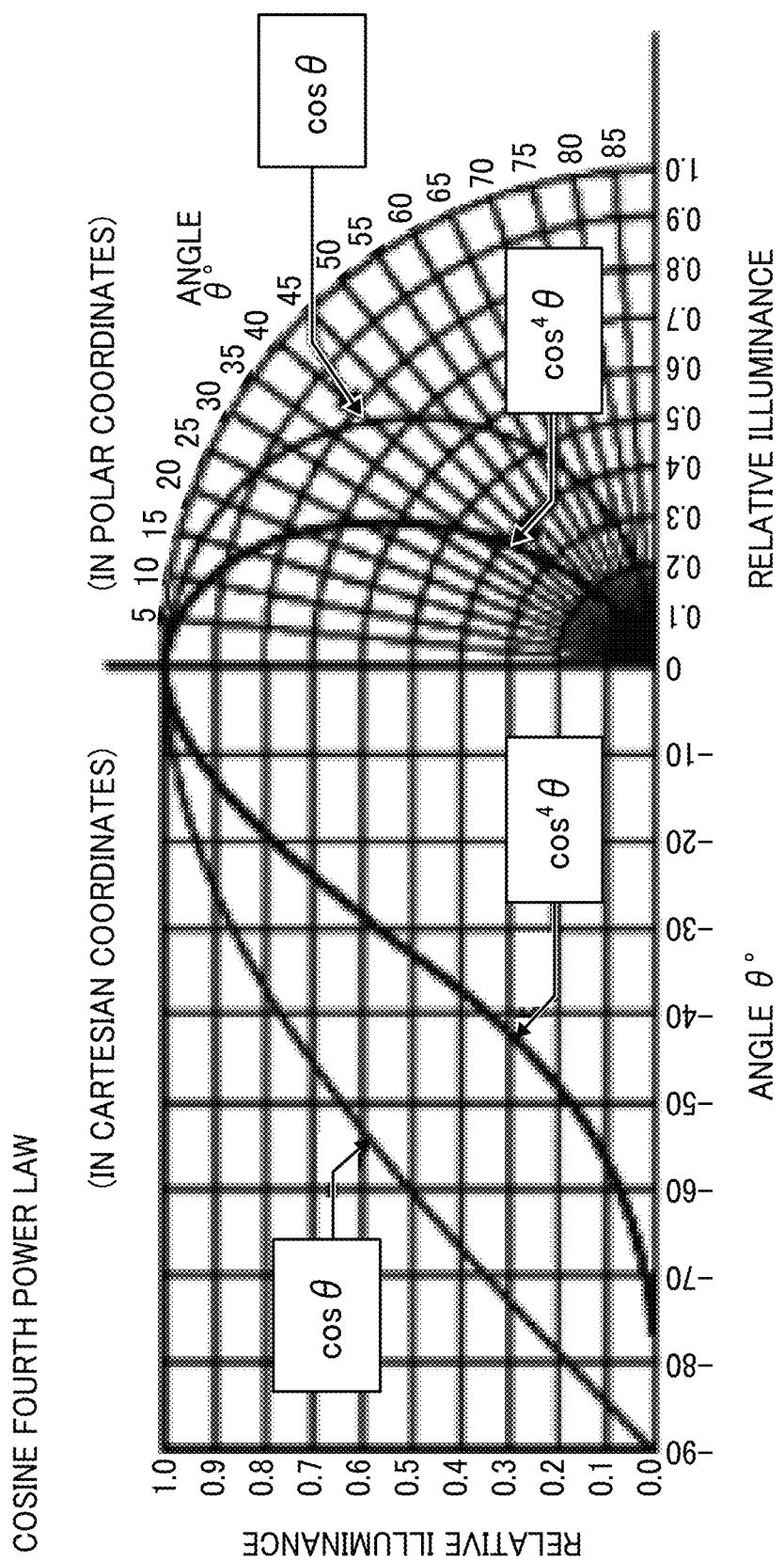
FIG. 3 is a chart illustrating illuminance of a plane illuminated by LED light.

A description is given below of the illuminance of a plane illuminated by LED light with reference to FIG. 3. Illuminance (lux) is an index of brightness of a surface illuminated by light. FIG. 3 is a chart illustrating the relationship between incident angle and illuminance according to the cosine fourth power law. The left side of FIG. 3 illustrates the relationship in the Cartesian coordinates, and the right side of FIG. 3 illustrates the relationship in the polar coordinates. The cosine fourth power law presents the relationship expressed by Equation 1 below, where $I_0$ represents the illuminance of the light before the incident, I represents the illuminance of the light after the incident, and θ represents the angle of incidence of the light with respect to the optical axis.

$$I = I_0 \cos^4 \theta \qquad \text{Equation 1}$$

In FIG. 3, the thinner line represents the value calculated by multiplying the illuminance $I_0$ by cos θ, and the bold line represents the value acquired by the Cosine 4th power law. When the incident angle θ with respect to the optical axis exceeds about 20°, the illuminance of the LED light drops sharply, and the graph of the illuminance is flat in a range of the incident angle θ of about 50° or greater.

For this reason, when infrared and LED light are emitted in the same direction, the light reaches a distant object since the illuminance of the LED light is high. On the other hand, when infrared and LED light are emitted in different directions, the illuminance of the LED light becomes low, and the light reaches only a close object.

From the above, in the detection device according to the present embodiment, infrared emitted is adjusted to have a wavelength of equal to or lower than 800 nm or a wavelength of equal to or higher than 1100 nm, as to maintain a substantially constant sensitivity. The LED light is emitted in a direction different from the direction of the infrared, so that only an object within a predetermined distance can be detected with the combination of LED light having a low illuminance and infrared. As a result, erroneous detection of an object can be reduced.

Figure 4:
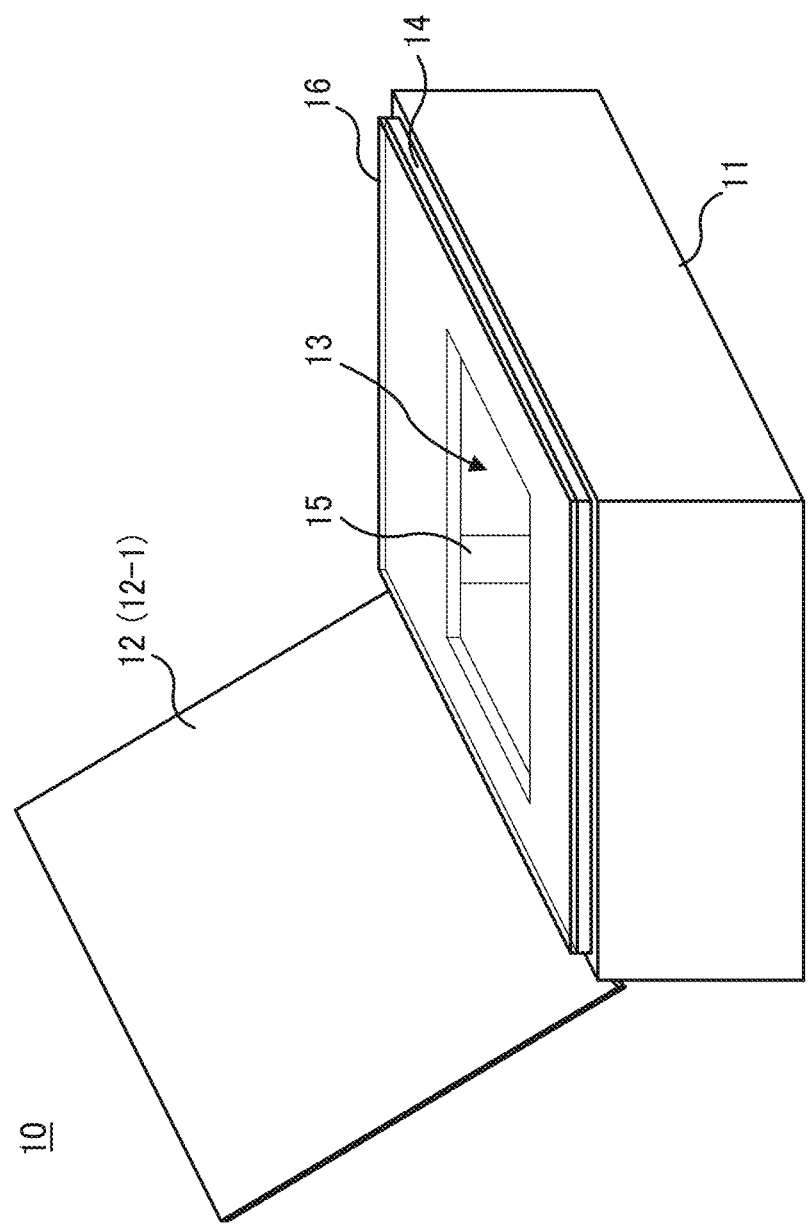
FIG. 4 is a perspective view illustrating an example of an exterior of a detection device according to an embodiment.

FIG. 4 is a perspective view illustrating an example of an exterior of a detection device 10 according to the present embodiment. The detection device 10 includes a container 11, a lid 12 that opens and closes the upper side of the container 11, and a cover 14 (a container cover) having a window 13. The container 11 houses a control board 20 (see FIG. 7A) and a power supply unit 21 (see FIG. 7A) that supplies power to the control board 20. The cover 14 covers the upper side of the container 11 when the lid 12 is open. A transparent substrate 16 (a transparent member) that is a transparent flat plate is bonded to the upper side of the cover 14. The transparent substrate 16 may be attached to the cover 14 with adhesive tape or the like. Infrared and LED light are emitted from inside the container 11, pass through the transparent substrate 16 covering the window 13 (an opening), and radiate to the outside.

In the present embodiment, the transparent substrate 16 is bonded to the upper side of the cover 14, and the size of the transparent substrate 16 is the same as that of the cover 14. However, alternatively, the transparent substrate 16 may be bonded to the lower side of the cover 14. Yet alternatively, the cover 14 may have the size similar to the size of the window 13. The transparent substrate 16 may be fitted in the window 13.

The container 11 includes four supporting members 15 to support the cover 14. The supporting members 15 are disposed at four corners of the container 11, respectively. To prevent the cover 14 placed on the supporting members 15 from easily moving in the horizontal direction, the top of each supporting member 15 is made of a material having a large coefficient of friction with the surface of the flat cover 14. Alternatively, the top of each supporting member 15 has a large surface roughness. Examples of the material having a large coefficient of friction include rubber and cloth. Regarding surface roughness, the surface becomes coarse as the deviation in the direction perpendicular to the surface increases, and the surface becomes smooth as the deviation decreases. In this example, it is desirable that the surface roughness is large. Alternatively, rubber, cloth, or the like may be attached to the four corners of the cover 14.

On one side of the control board 20, an infrared source and an LED light source are disposed. The object is placed on the transparent substrate 16 that covers the window 13, and the infrared source and the LED light source emit infrared and LED light to the object through the transparent substrate 16. On the other side of the control board 20, a light-receiving device that receives the light reflected from the object is provided. When an object is on the transparent substrate 16, the light-receiving device receives the reflected light. When there is no object thereon, the light-receiving device does not receive the reflected light. Thus, the detection device 10 can detect the presence or absence of the object.

The container 11 has a size that can accommodate the control board 20 and the power supply unit 21. The material and color of the container 11 have a low reflectance relative to the infrared and the LED light emitted from the control board 20. This is for the detection element to receive only the light reflected from the object and not to receive the light reflected from inner faces 11-1 (see FIG. 7B) of the container 11. Therefore, the cover 14 on the upper side of the container 11 that may reflect infrared and LED light is also made of a material and has a color having a low reflectance to infrared and LED light.

The transparent substrate 16 transmits infrared. When the infrared transmittance is high, the transparent substrate 16 may allow infrared to reach a distant position even though the wavelength is controlled to 800 nm or lower or 1100 nm or higher. It is sufficient for infrared to reach an object on the transparent substrate 16. Therefore, the transparent substrate 16 is preferably made of a material having a low infrared transmittance.

Further, the material of the transparent substrate 16 preferably has a small refractive index so as not to totally reflect infrared but allows infrared to pass through.

FIG. 5 is a table illustrating infrared transmittances and refractive indexes of example materials. The refractive index of each of materials in FIG. 5 is as small as about 1.5. Regarding the transmittance, vinyl chloride resin has a small transmittance compared with glass and acrylic resin, and the transmittance of vinyl chloride resin decreases as hardness increases. Therefore, the transparent substrate 16 is preferably made of hard vinyl chloride resin.

The transparent substrate 16 may be colored as long as transparency is maintained, and examples of the color include blue and green. In order to reduce the transmittance of infrared, green, which is a complementary color of red color of infrared, is desirable.

The container 11 and the cover 14 are preferably made of a non-metal material having a high infrared absorption rate, and examples of the non-metal material include ceramics, plastics, wood, and paper.

FIG. 6 is a table illustrating the reflectance of example materials and colors relative to infrared and LED light. FIG. 6 presents acrylic resin, vinyl chloride resin, paper, and corrugated cardboard as example materials. Regarding acrylic resin, the reflectance is presented for each of example colors of the inner face 11-1 of the container 11 or an inner face 14-1 (see FIG. 7B) of the cover 14.

The reflectance illustrated in FIG. 6 are results of an experiment in which infrared and LED light were emitted in a state where no object was on the transparent substrate 16. Since there is no object, when there is no reflection on the inner face 11-1 of the container 11 and the inner face 14-1 of the cover 14, entire light is emitted to the outside through the transparent substrate 16, and the reflectance is 0. In the experiment, the infrared having a wavelength of 950 nm and LED light having a wavelength of 500 nm were used.

Acrylic resin did not react to the infrared only when the color was black. In other materials, the vinyl chloride resin having black color did not react to the infrared. The reflectance was also small at about 2% only when the color was black. Accordingly, the inner face 11-1 (a first inner face) of the container 11 and the inner face 14-1 (a second inner face) of the cover 14 are preferably black.

The inner face 11-1 of the container 11 and the inner face 14-1 of the cover 14 to which the infrared are applied are preferably black. Even when the color is black, the inner faces 11-1 and 14-1 are preferably rough not glossy nor smooth. A rough surface not glossy nor smooth can better reduce the reflectance. Examples of the rough surface include a surface having a plurality of fine grooves and a surface having a plurality of fine irregularities. The surface may be made rough by attachment of a fluffy sheet, such as a felt, in which fibers are fuzzed.

Desirably, a bottom face 12-1 (see FIG. 4) of the lid 12 is black. The bottom face 12-1 is an inner face that faces the inside of the container 11 when the lid 12 closes the upper side of the container 11. The lid 12 prevents infrared from reacting with a white wall or the like when there is no object. For example, the lid 12 can be hinged to the container 11 so as to open and close, and can be secured at a given degree of opening (at a given open position). This structure is also to make the infrared hit the lid 12 when there is no object.

The detection device 10 is not limited to the structure, illustrated in FIG. 4, including the container 11 separate from the cover 14 to which the transparent substrate 16 is bonded. Alternatively, the container 11 is integral with the cover 14 to which the transparent substrate 16 is bonded.

Figure 7A:
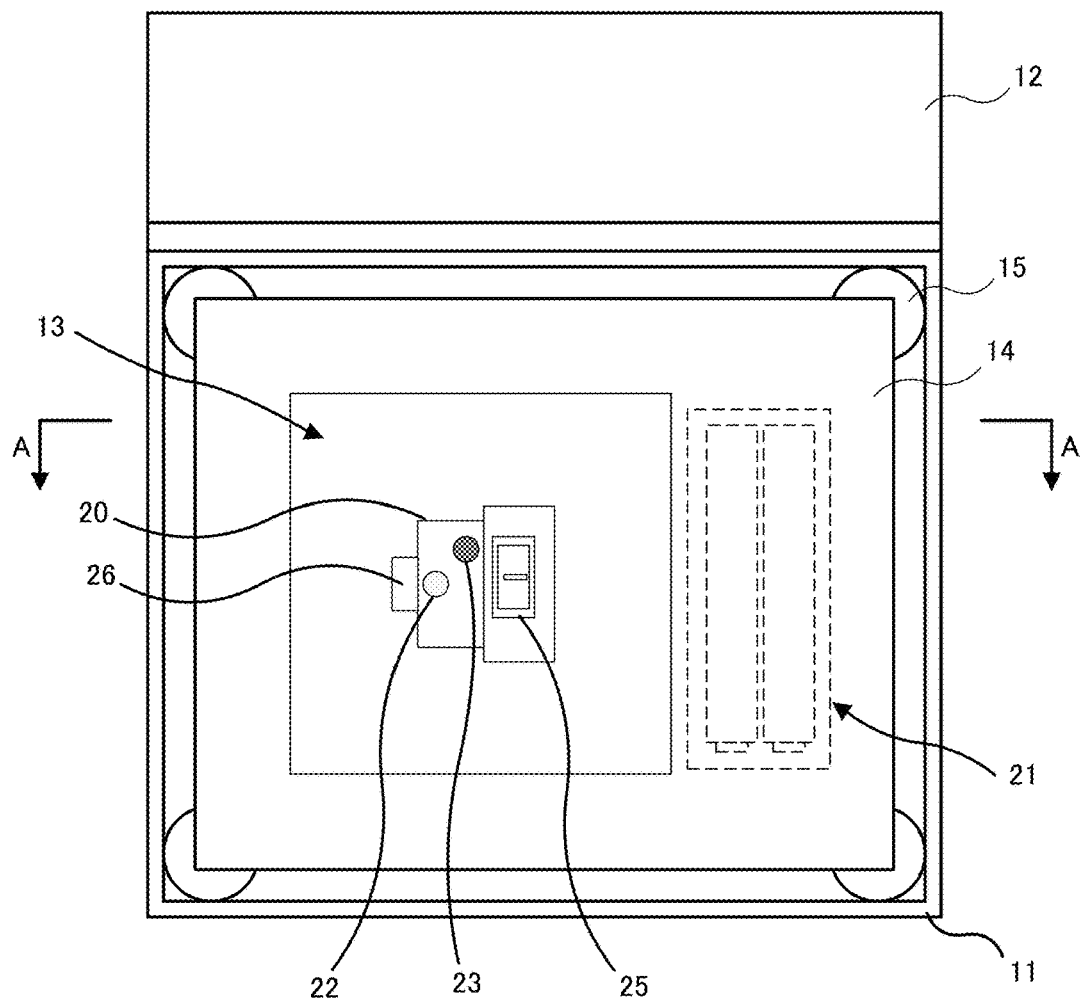
FIGS. 7A and 7B are views illustrating an example of an internal configuration of the detection device illustrated in FIG. 4.
Figure 7B:
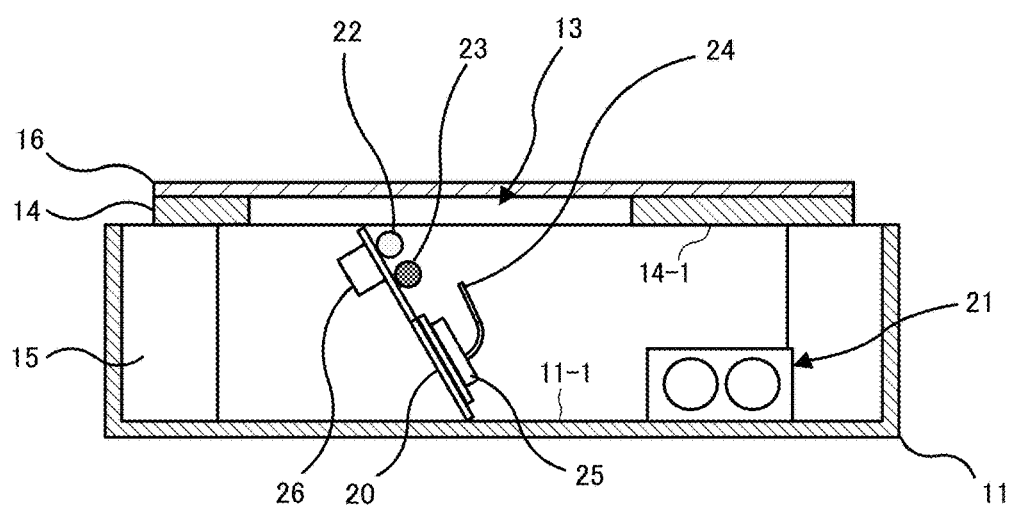

FIGS. 7A and 7B are views illustrating an example of an internal configuration of the detection device 10. FIG. 7A is a plan view illustrating an interior of the container 11 in a state where the lid 12 is open and the cover 14 is placed. FIG. 7B is a cross-sectional view cut along line A-A in FIG. 7A.

Inside the container 11, the control board 20 and the power supply unit 21 illustrated by a broken line are disposed. The control board 20 is a flat plate made of, for example, plastic such as polyimide or polyester (PET). The control board 20 includes, on a first side thereof, a first light source 22 that emits infrared, a second light source 23 that emits LED light, and a communication circuit 25 including a wireless antenna 24. The control board 20 further includes, on a second side (on the back side of the first side) thereof, a light-receiving device 26 that receives the reflected light of the infrared. The light-receiving device 26 is an infrared sensor and functions as a detector to detect reflected light for detecting an object.

The control board 20 is disposed so that each face of the control board 20 is inclined with respect to the vertical direction. Such placement enables the light-receiving device 26, which is at a position different from the position of the first light source 22 in the horizontal direction, to receive the light reflected from the object. The vertical direction mentioned above is a direction perpendicular to the bottom surface of the container 11.

The first light source 22 is disposed so as to emit infrared in parallel to the surface of the control board 20. The second light source 23 is disposed so as to emit light in a direction different from the direction in which the first light source 22 emits the infrared. In the example illustrated in FIGS. 7A and 7B, the second light source 23 is placed so as to emit the LED light in a direction at about 90° from the infrared emission direction.

The power supply unit 21 includes a battery and supplies electric power to the first light source 22, the second light source 23, and the communication circuit 25 of the control board 20. The first light source 22 is provided with a dial for adjusting the wavelength.

Figure 8:
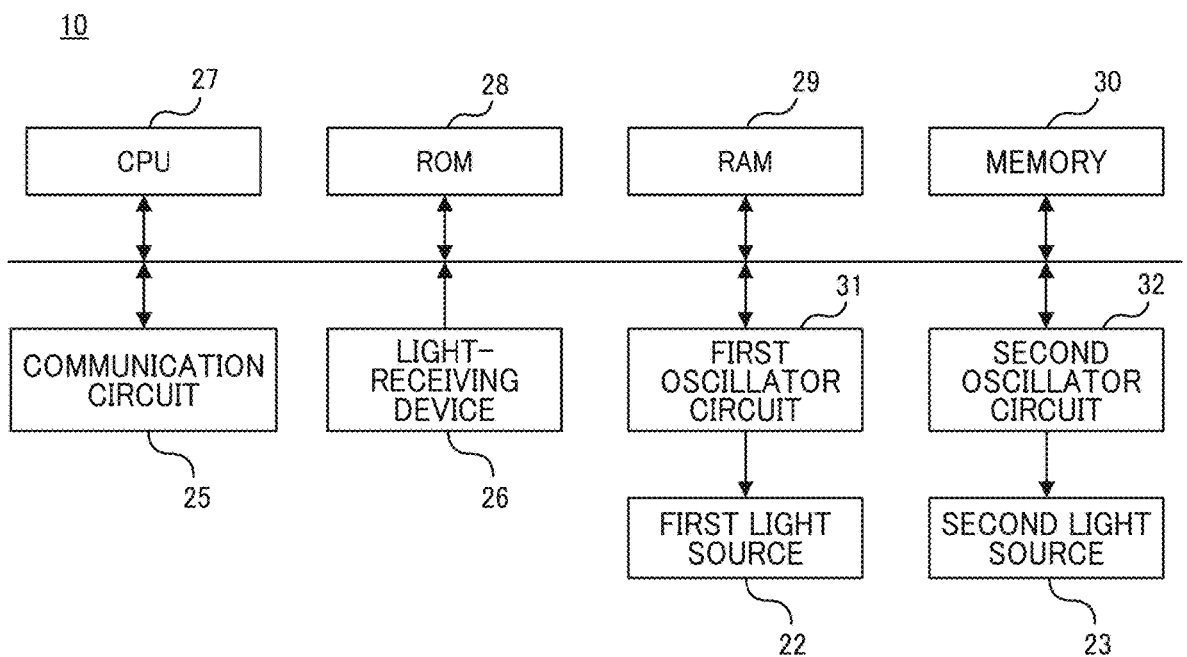
FIG. 8 illustrates an example of a hardware configuration of the detection device illustrated in FIG. 4.

FIG. 8 is a block diagram illustrating an example of a hardware configuration of the detection device 10. The detection device 10 includes the first light source 22 and the second light source 23 on the control board 20 illustrated in FIGS. 7A and 7B. The control board 20 of the detection device 10 further includes the communication circuit 25, the light-receiving device 26, a central processing unit (CPU) 27, a read only memory (ROM) 28, a random access memory (RAM) 29, a memory 30, a first oscillator circuit 31, and a second oscillator circuit 32. These components are connected via a bus.

The memory 30 functions as a storing unit. The memory 30 is a storage device, such as a volatile or non-volatile semiconductor memory, a hard disk drive (HDD), and a solid state drive (SSD). The memory 30 may include the ROM 28 and the RAM 29.

The ROM 28 is a non-volatile semiconductor storage device that stores a startup program of the detection device 10 and the like. The RAM 29 serves as a work area for the CPU 27. The ROM 28 or the memory 30 stores a program for implementing the function of the CPU 27. The program can be stored in, not limited to the ROM 28 and the memory 30, but a recording medium such as a recording disk. Further, the program may be transmitted via a wired network or a wireless network and loaded into the RAM 29.

Although the CPU 27 executes the program, thereby controlling the operation of the detection device 10 in the present embodiment, embodiments of the present disclosure is not limited thereto. Alternatively, a part or all of the functions implemented by the program may be implemented by a circuit or the like. Examples of circuits for implementing the functions include a large scale integration (LSI), a field-programmable gate array (FPGA), and an application-specific integrated circuit (ASIC).

The first oscillator circuit 31 controls the electric power supplied to the first light source 22 under the control of the CPU 27. The second oscillator circuit 32 controls the electric power supplied to the second light source 23 under the control of the CPU 27.

Figure 9:
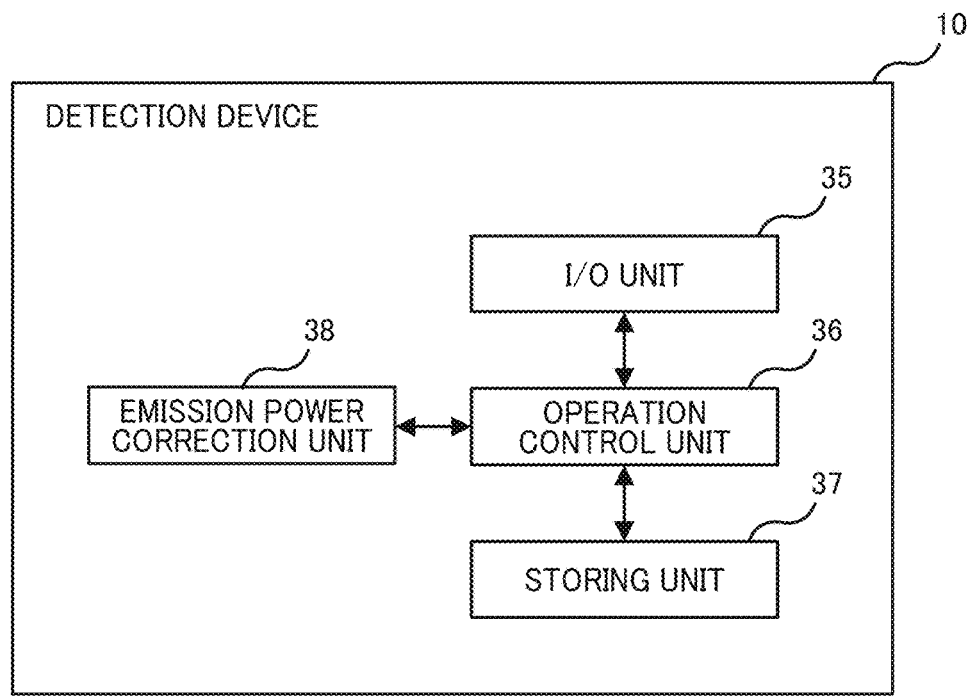
FIG. 9 is a block diagram illustrating an example of a functional configuration of the detection device illustrated in FIG. 8.

FIG. 9 is a block diagram illustrating an example of a functional configuration of the detection device 10. In the detection device 10, the CPU 27 implements each function using the communication circuit 25, the memory 30, and the like. The functions implemented by the CPU 27 include an input and output (I/O) unit 35, an operation control unit 36, a storing unit 37 which is also referred to as a memory, and an emission power correction unit 38.

The I/O unit 35 communicates with an external device via a wireless network, and transmits the detection result of the detection device 10 to the external device. The storing unit 37 stores identification information, such as a device identifier (ID) identifying the detection device 10. The emission power correction unit 38 adjusts the wavelength of infrared in order to adjust the emission power of infrared. The wavelength can be adjusted using a dial or the like. Although the wavelength is adjusted using a dial in the present embodiment, the infrared emission power may be adjusted by other methods.

The operation control unit 36 controls the entire operation of the detection device 10, determines the presence or absence of an object based on the output signal (voltage) from the light-receiving device 26, and instructs the I/O unit 35 to transmit the determination result as the detection result together with the device ID.

Figures 10A, 10B:
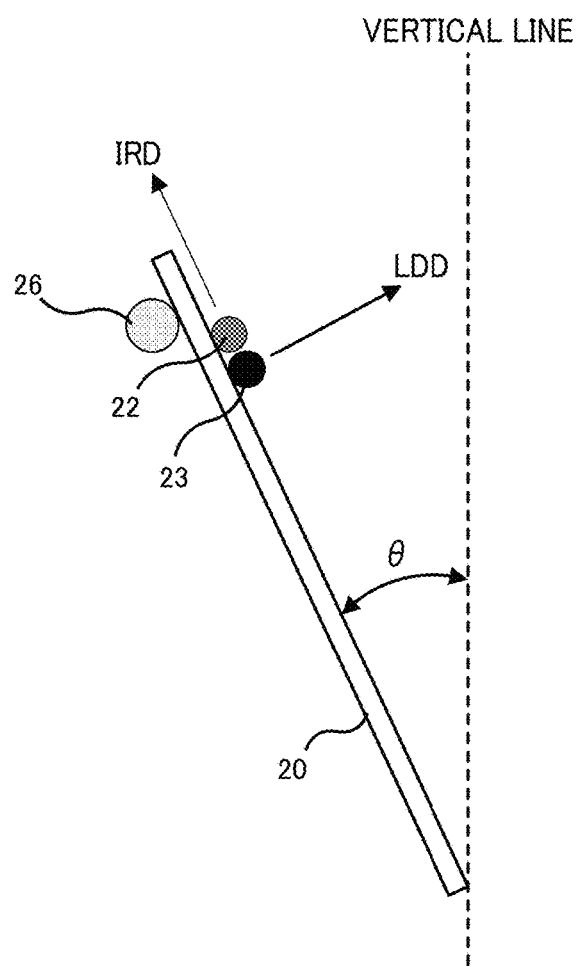
FIG. 10A illustrates the angle of inclination of a control board of the detection device illustrated in FIG. 4, relative to a vertical direction according to an embodiment.
FIG. 10B is a table illustrating relations between the angle of inclination of the control board and infrared reaction.

Referring to FIGS. 10A and 10B, a description is given below of an angle θ of inclination of the control board 20. The angle θ is formed by a vertical line extending in the vertical direction and the control board 20 (one side of the control board 20) as illustrated in FIG. 10A. In FIG. 10A, arrow IRD indicates the direction in which the infrared is emitted, arrow LDD indicates the direction in which the LED light is emitted. The inventors has studied, in an experiment, whether infrared is detected (whether infrared reacts) in a state where the window 13 is present above the control board 20 and there is no object. The container 11 used in the experiment was made of black general-purpose acrylonitrile butadiene styrene (ABS) resin and had a thickness of 1 mm. Further, the transparent substrate 16 used was a transparent flat plate made of a hard vinyl chloride resin, having a color of blue, and having a thickness is 1 mm.

As illustrated in FIG. 10B, when the angle θ was in a range of 0 to 25°, the infrared reacted even with the absence of an object. Thus, such a range is not suitable for object detection. When the angle θ was 26 to 29°, the infrared reacted in some cases and did not reacted in some cases. Thus, such a range is not suitable for object detection because the detection results are unstable.

When the angle θ was 30° or greater, the infrared did not react. When the angle θ exceeds 50°, the position of the window 13 needs to be away from the control board 20, which makes it difficult for the infrared to return. Additionally, the size of the container 11 should be increased, and the cost increases. Therefore, the angle θ is preferably from 30° to 40°.

Referring to FIGS. 11A and 11B, a description is given below of results of an experiment performed to study the distance (detection distance) from the transparent substrate at which the object can be detected with the angle θ set to 35°. FIG. 11A illustrates the result acquired with infrared having a wavelength near the center wavelength of infrared. FIG. 11B illustrates the result acquired with infrared having a wavelength lower, by 100 nm or greater, than the center wavelength (with reduced power of infrared). Further, FIG. 11C illustrates the results acquired with reduced power of infrared and the LED light emitted in a direction different from the direction of the infrared. The LED light was emitted in a direction at about 90° different from the direction of the infrared.

When the infrared having the wavelength near the center wavelength was emitted, the power of the infrared was strong, and an object even at a distance of 10 cm from the transparent substrate 16 was detected as illustrated in FIG. 11A. On the other hand, when the infrared power was reduced, as illustrated in FIG. 11B, the object at a distance up to 1 cm from the transparent substrate 16 was detected. However, when the distance was 2 cm, the detection was unstable, and the object was detected in some cases and not detected in some cases.

On the other hand, when the infrared power was reduced and the LED light was emitted in the different direction, an object at a distance up to 4 cm from the transparent substrate 16 was detected as illustrated in FIG. 11C.

In order to detect a bait as the detected object, it is desirable to detect the object even at a distance of about 4 cm from the transparent substrate 16 because the shape and size differ depending on the bait. The capability to detect a position about 4 cm away from the transparent substrate 16 is advantageous in detecting the presence of creatures such as pests and vermin based on the presence or absence of the bait placed on the transparent substrate 16.

However, the configurations illustrated in FIGS. 4, 7A, and 7B does not enable changing the detectable distance according to the size of the bait. In this configuration, the detection device 10 detects a range up to 4 cm even when the size of the bait is small. Then, when there is no bait, but a nontarget object exists in the range of 4 cm, the detection device 10 erroneously detects that there is the bait. Therefore, changing the detectable distance of the bait according to the size is desirable.

Figure 12:
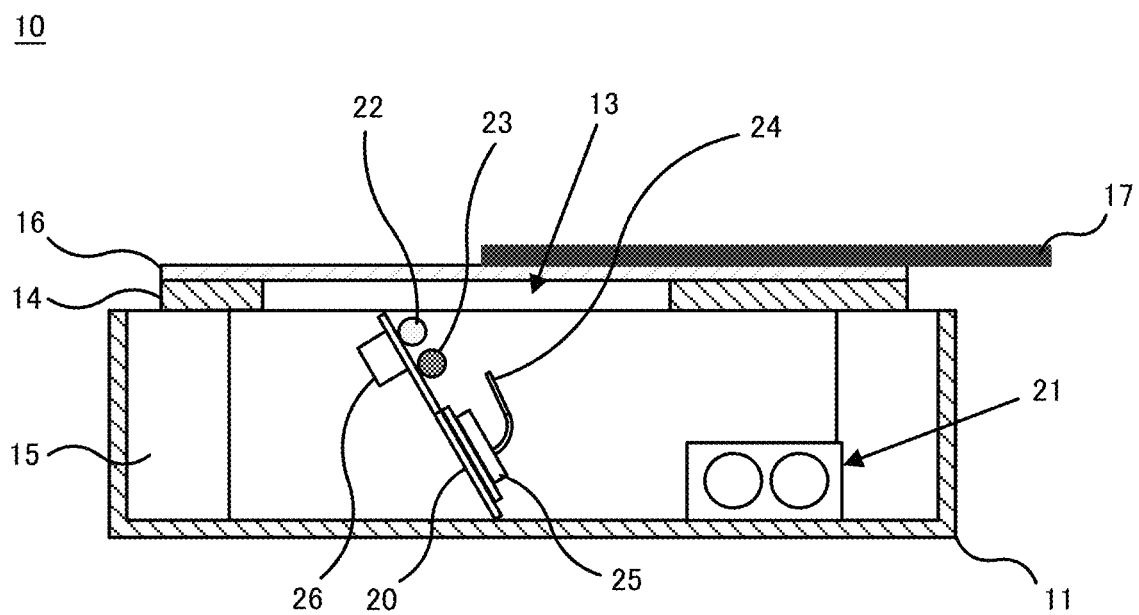
FIG. 12 is a view illustrating a configuration of a detection device according to another embodiment.

FIG. 12 is a view illustrating another example of the configuration of the detection device 10. The detection device 10 includes the container 11, the lid 12 (see FIG. 4), the cover 14 having the window 13, the control board 20, and the power supply unit 21. The detection device 10 illustrated in FIG. 12 further includes a shielding plate 17, which is an example of a shield to shield a portion of the window 13.

Figure 13A:
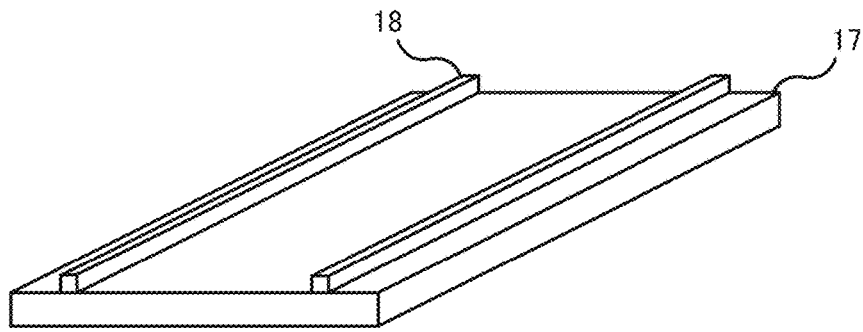
FIGS. 13A, 13B, and 13C are perspective views illustrating an example of a slide mechanism of a shielding plate of the detection device illustrated in FIG. 12.
Figure 13B:
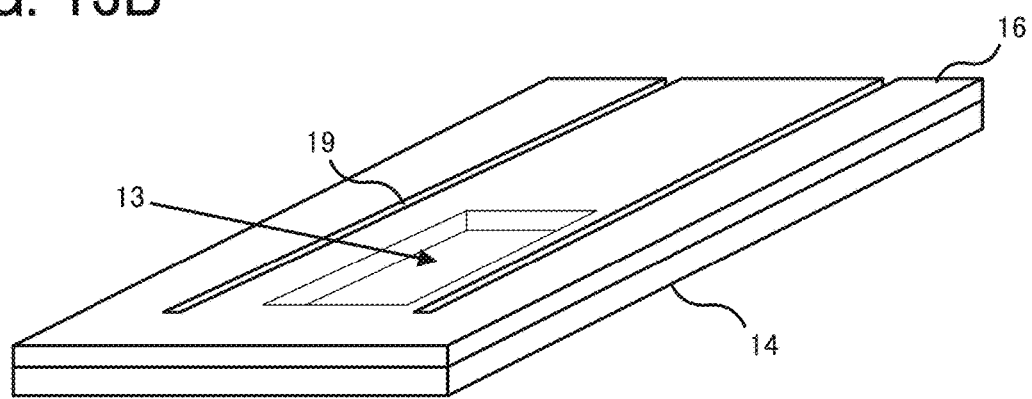

The shielding plate 17 is slidable on the transparent substrate 16 covering the window 13 so as to transmit only a portion of the light from the second light source 23 and partly shield the window 13 serving as an optical path for the light from the second light source 23. With this configuration, the light from the first light source 22 and a portion of the light from the second light source 23 pass through the transparent substrate 16 and irradiate the object on the transparent substrate 16. As illustrated in FIG. 13A, the shielding plate 17 includes rails 18 adjacent to both ends of the shielding plate 17. As illustrated in FIG. 13B, the transparent substrate 16 includes two grooves 19 extending in one direction on the upper surface thereof. The rails 18 are fitted into the grooves 19, and the shielding plate 17 is moved along the grooves 19.

Figure 13C:
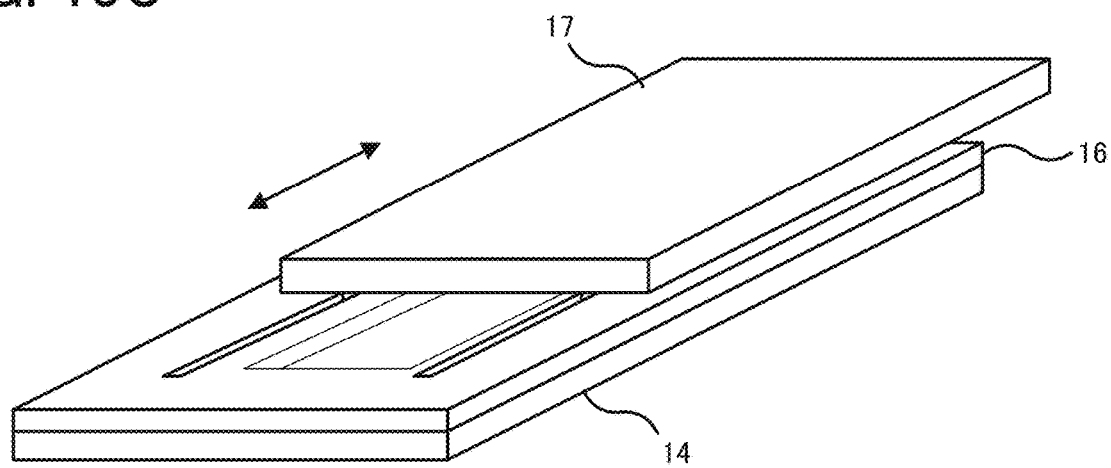

As illustrated in FIG. 13C, the detectable distance can be changed by sliding the shielding plate 17 and changing the rate of shielding the window 13. Similar to the container 11 and the cover 14, the shielding plate 17 is preferably made of a black material having low infrared reflectance, and the inner surface facing the inside of the container 11 is not glossy nor smooth but is rough.

In this example, the rails 18 are disposed on the shielding plate 17, and the grooves 19 are in the transparent substrate 16, but the fitting structure therebetween is not limited thereto. Alternatively, for example, the grooves 19 may be deep to extend into the cover 14 below the transparent substrate 16. Yet alternatively, when the transparent substrate 16 is attached to the lower side of the cover 14, or the transparent substrate 16 has a size just enough to cover the window 13, the grooves 19 may be in the cover 14.

The inventors have studied the detectable distance by changing the ratio of shielding the window 13 with the shielding plate 17. FIGS. 14A to 17B are views illustrating examples in which the ratio of shielding the window 13 are different. The inventors have studied the intensity of reflected light of the LED in the examples illustrated in FIGS. 14A to 17B.

Figure 14A:
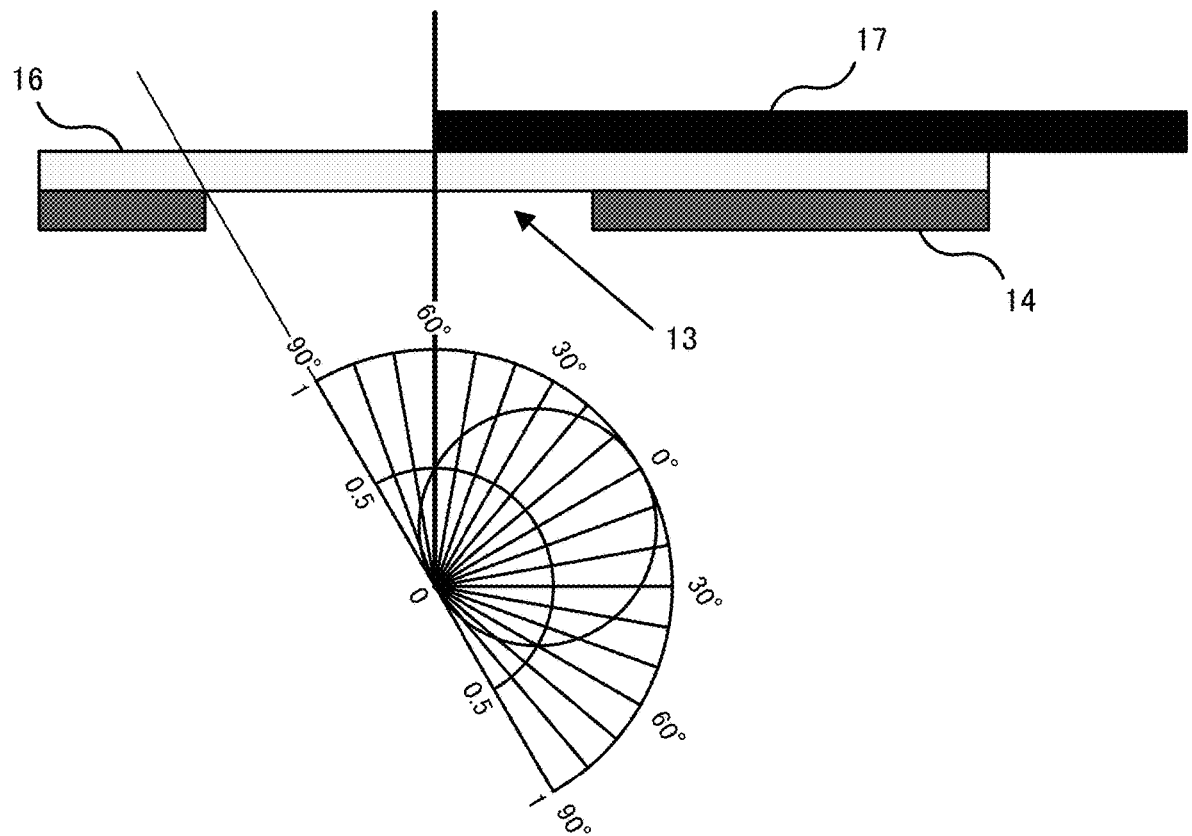
FIGS. 14A and 14B are diagrams illustrating a state in which an end of the shielding plate is at a first position in the detection device illustrated in FIG. 12.
Figure 14B:
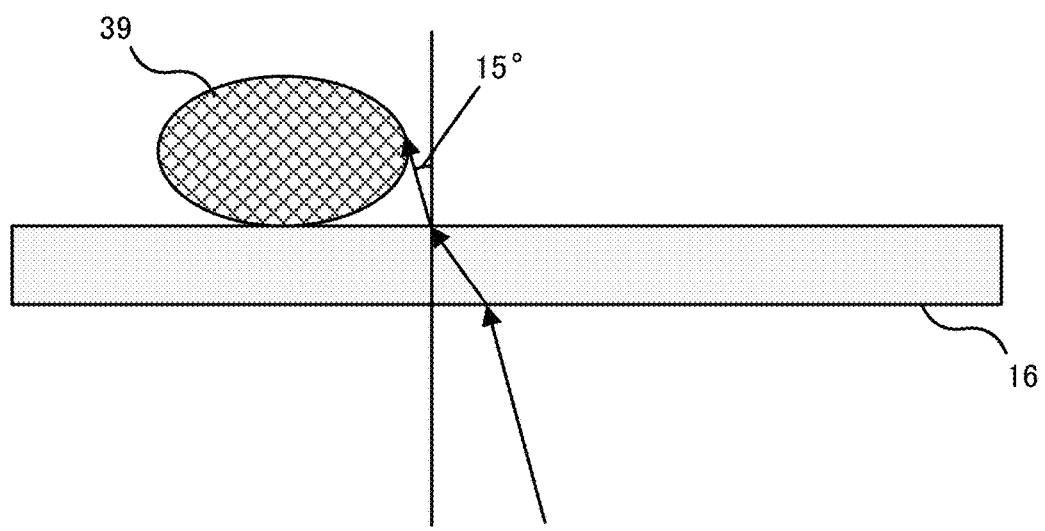

FIGS. 14A and 14B illustrate an example where the angle θ is 30° and the shielding plate 17 is placed such that the boundary between the transparent substrate 16 and the shielding plate 17 is on the second light source 23 that is the LED. FIG. 14A includes an LED emission intensity distribution map represented by a circle. When the direction perpendicular to the surface of the control board 20 is 0°, for the LED light, the portion of the window 13 not shielded by the shielding plate 17 is in the range of 60° to 90°. Since the center of such an angle range is 75°, the LED light is tilted by 75°.

As illustrated in FIG. 14B, the LED light is incident on the transparent substrate 16 at an angle of 75°. When the light that has traveled in air enters the transparent substrate 16, the light changes the direction in passing through the transparent substrate 16 due to a change in the refractive index. When the light exits the transparent substrate 16 and returns to the air, the direction of travel of light returns to the same direction as before entering the transparent substrate 16, and the light reaches an object 39 on the transparent substrate 16.

In this example, the light reflected from the object 39 had an LED intensity of 30% on average, which was equal to or smaller than half (half value) of the peak value. The peak value mentioned here is the LED intensity in the 0° direction. The average is used because the intensity varies depending on the angle range of 60° to 90°. The detectable distance at this time was about 5.3 cm.

Figure 15A:
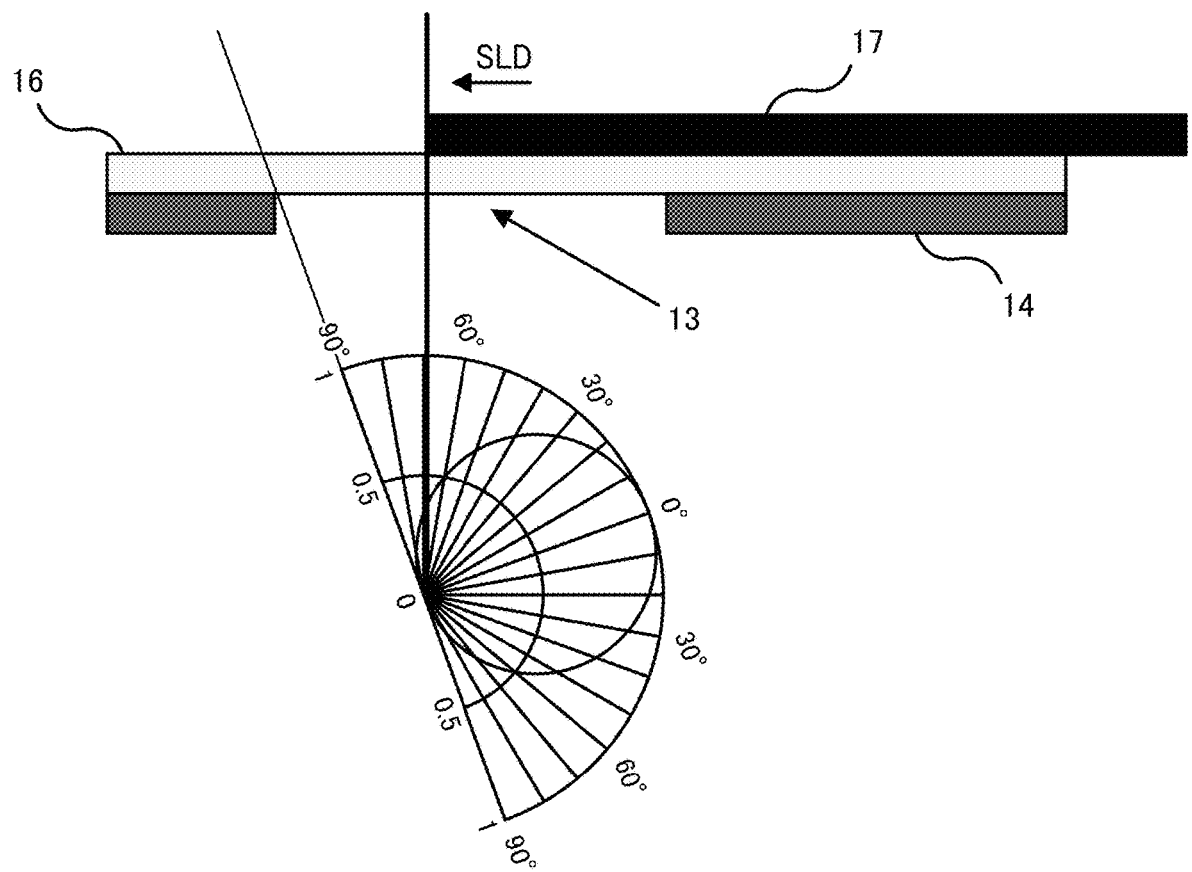
FIGS. 15A and 15B are diagrams illustrating a state in which the end of the shielding plate is at a second position in the detection device illustrated in FIG. 12.
Figure 15B:
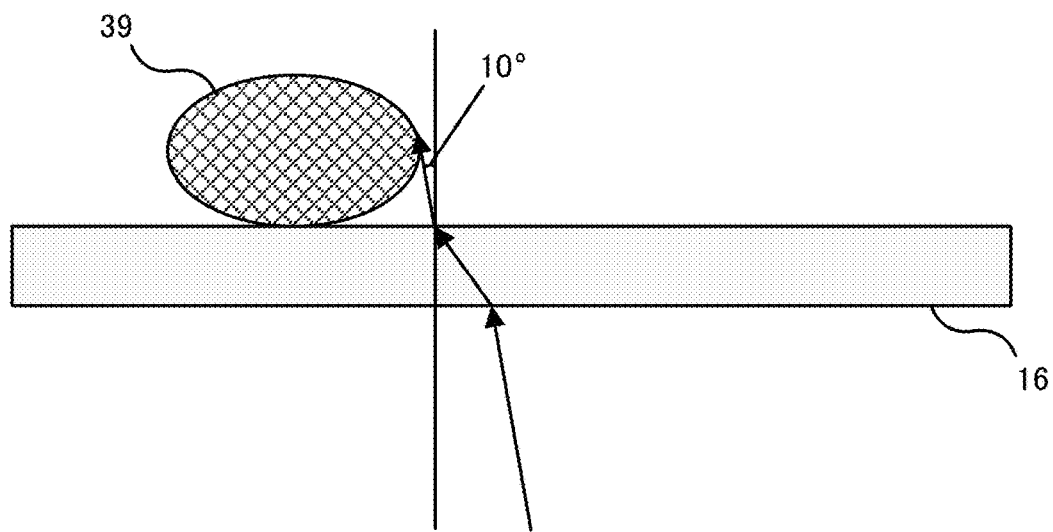

FIGS. 15A and 15B illustrate an example where the angle θ is set to 20°, and the shielding plate 17 is moved in the direction indicated by arrow SLD to shield the window 13 as compared with the example illustrated in FIGS. 14A and 14B. The portion of the window 13 not shielded by the shielding plate 17 is in the range of 70° to 90°. The center of this angle range is 80°, which means that the LED light is tilted by 80°.

Also in this case, the LED light incident on the transparent substrate 16 at an angle of 80° changes the direction, due to the change in the refractive index, when passing through the transparent substrate 16, after which the LED light reaches the object 39. The LED intensity of the light reflected from the object 39 was 20% on average of the peak value. The detectable distance at this time was about 4.2 cm.

Figure 16A:
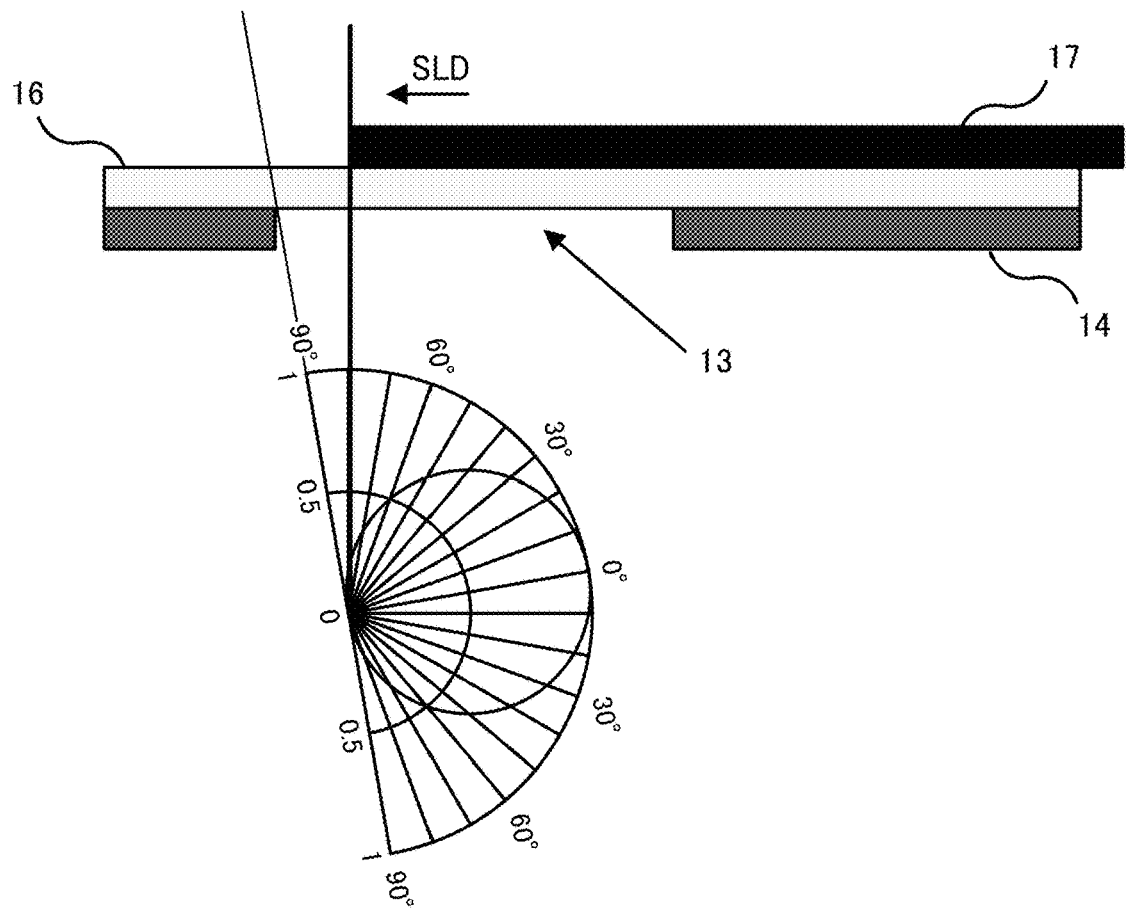
FIGS. 16A and 16B are diagrams illustrating a state in which the end of the shielding plate is at a third position in the detection device illustrated in FIG. 12.
Figure 16B:
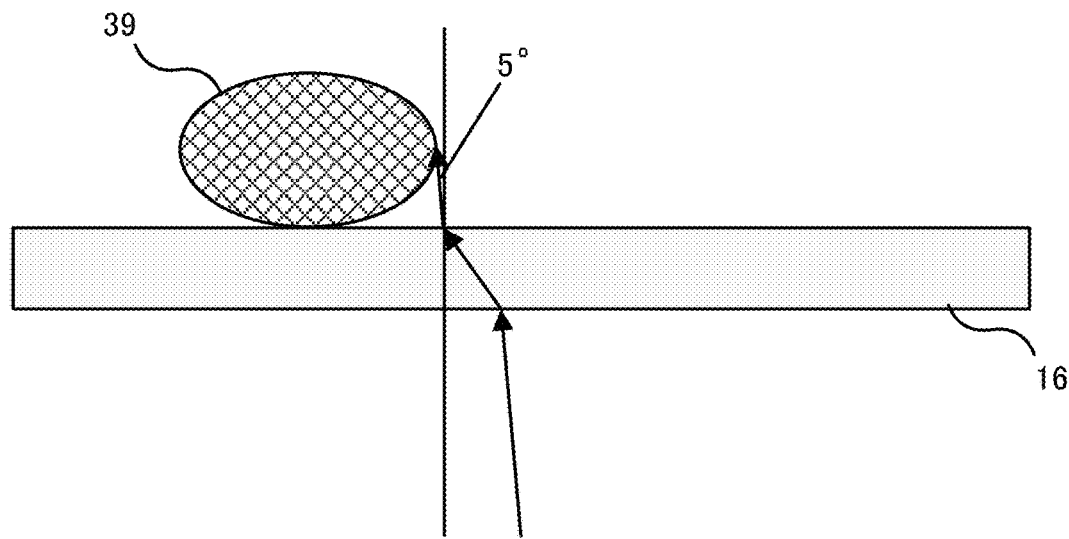

FIGS. 16A and 16B illustrate an example where the angle θ is 10°, and the shielding plate 17 is moved further in the direction indicated by arrow SLD to shield the window 13 as compared with the example illustrated in FIGS. 15A and 15B. The portion of the window 13 not shielded by the shielding plate 17 is in the range of 80° to 90°. The center of this angle range is 85°, which means that the LED light is tilted by 85°.

Also in this case, the LED light incident on the transparent substrate 16 at an angle of 85° changes the direction, due to the change in the refractive index, when passing through the transparent substrate 16, after which the LED light reaches the object 39. The LED intensity of the light reflected from the object 39 was 10% on average of the peak value. The detectable distance at this time was about 3.5 cm.

Figure 17A:
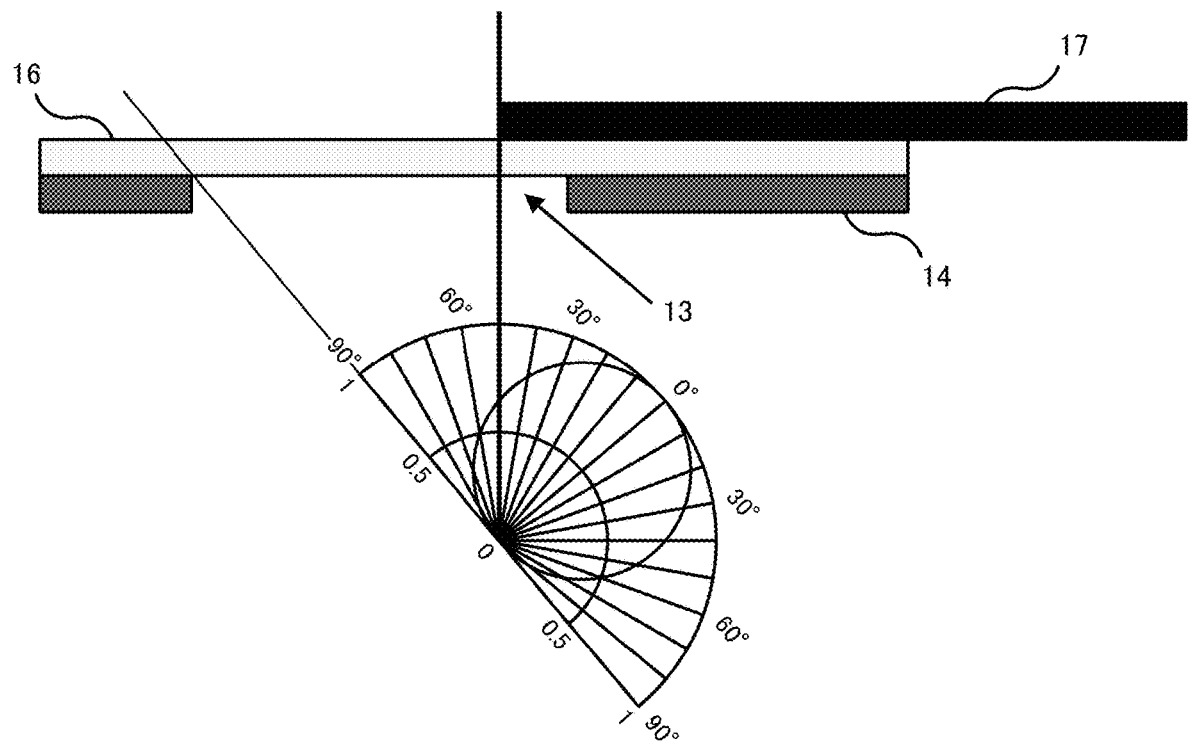
FIGS. 17A and 17B are diagrams illustrating a state in which the end of the shielding plate is at a fourth position in the detection device illustrated in FIG. 12.
Figure 17B:
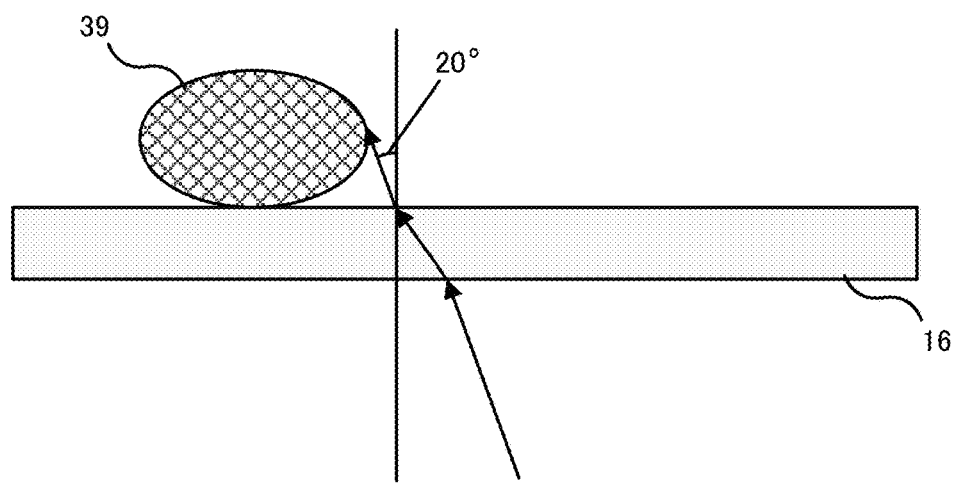

FIGS. 17A and 17B illustrate an example where the angle θ is 40°, and the shielding plate 17 is moved in the direction to open the window 13 as compared with the example illustrated in FIGS. 14A and 14B. The portion of the window 13 not shielded by the shielding plate 17 is in the range of 50° to 90°. The center of this angle range is 70°, which means that the LED light is tilted by 70°.

Also in this case, the LED light incident on the transparent substrate 16 at an angle of 70° changes the direction, due to the change in the refractive index, when passing through the transparent substrate 16, after which the LED light reaches the object 39. The LED intensity of the light reflected from the object 39 was 43% on average of the peak value. The detectable distance at this time was about 6.5 cm.

Figure 18:
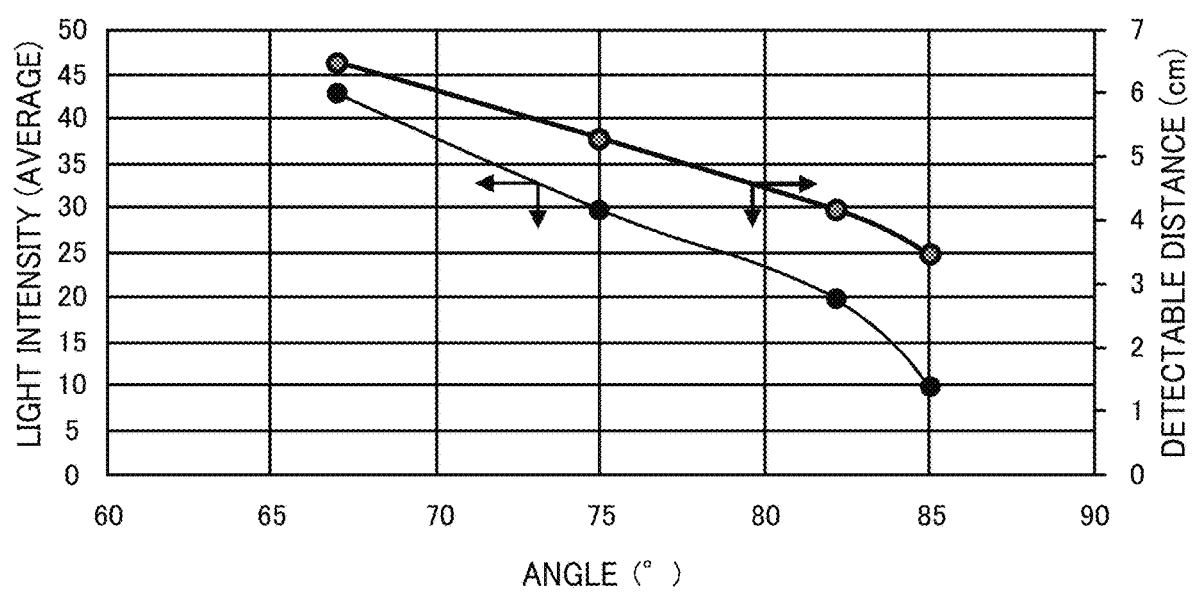
FIG. 18 is a diagram illustrating the relationship between the angle of light, light intensity, and a detection distance by the detection device illustrated in FIG. 12.

The results of the experiment are summarized in FIG. 18. In FIG. 18, the horizontal axis indicates the angle formed by the vertical line and the direction in which the LED light is emitted, and the vertical axis indicates the average light intensity (%) and the detectable distance (cm).

According to FIG. 18, by changing the ratio of shielding the window 13 with the shielding plate 17, the light intensity can be changed, thereby changing the detectable distance. The range of the detectable distance can be reduced to about 2 cm by reducing the angle θ, and can be increased by about 10 cm by increasing the angle θ. As a result, only an object at a distance shorter than 10 cm from the light source can be detected via the transparent substrate 16 according to the size of the object.

Figure 19A:
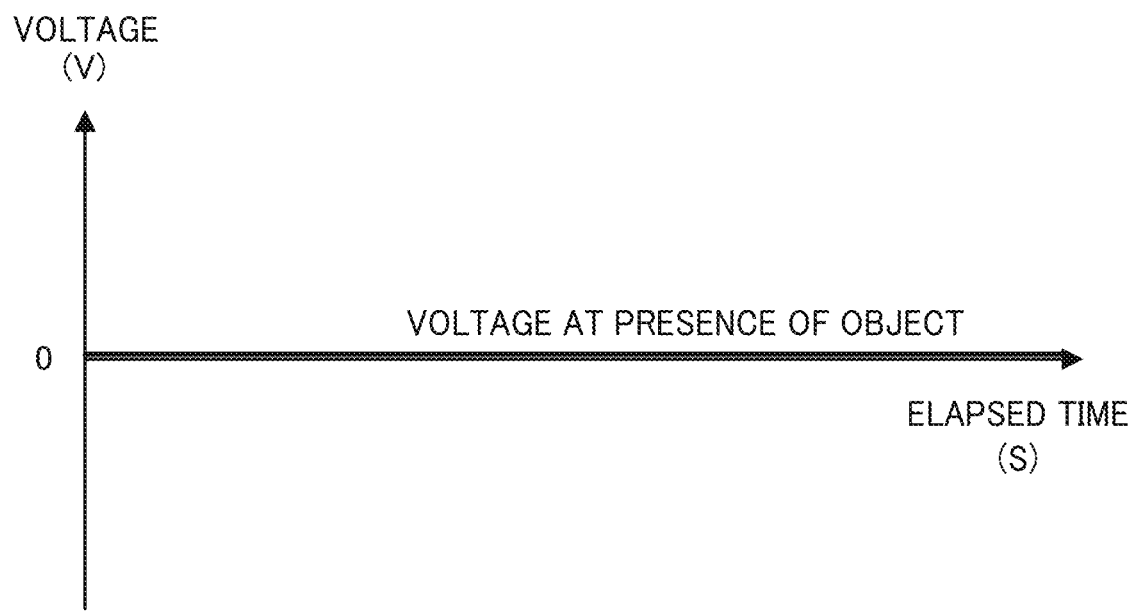
FIGS. 19A and 19B are diagrams illustrating the relationship between an elapsed time and an output signal of the light-receiving device of the detection device illustrated in FIG. 12.
Figure 19B:
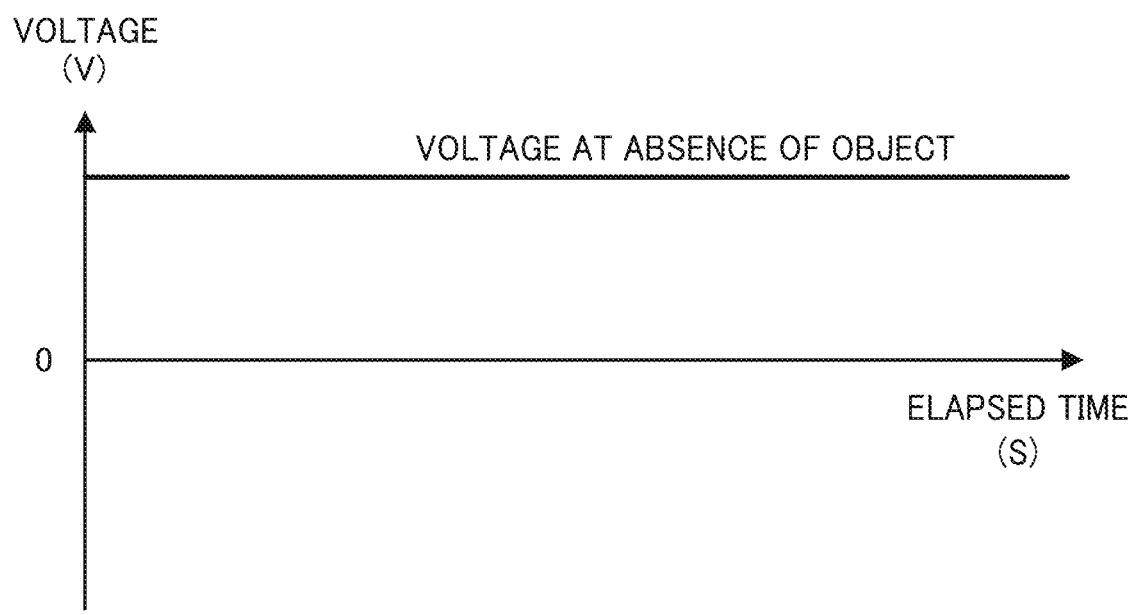

FIGS. 19A and 19B are graphs illustrating the relationship between the elapsed time (in seconds) and the output signal (voltage) converted from the light received by the light-receiving device 26. FIG. 19A is a graph illustrating an example of a signal output when there is an object on the transparent substrate 16. FIG. 19B is a graph illustrating an example of a signal output when there is no object on the transparent substrate 16.

The output voltage of the light-receiving device 26 when there is an object on the transparent substrate 16 is set to 0 V, and the light-receiving device 26 keeps outputting a voltage of 0V while the object exists as illustrated in FIG. 19A. When the object disappears from the transparent substrate 16, the light-receiving device 26 outputs a voltage having a given value. In the example illustrated in FIG. 19B, the voltage at the absence of an object is set, for example, to 5V, and the light-receiving device 26 keeps outputting a voltage of 5V while there is no object.

Although the light-receiving device 26 outputs 0V when there is an object and outputs 5V when there is no object, the output voltage is not limited thereto. Alternatively, for example, the light-receiving device 26 may output 5V when there is an object and output 0 V when there is no object.

The operation control unit 36 determines the presence or absence of an object based on the voltage output from the light-receiving device 26. The operation control unit 36 determines that there is an object in response to the output of 0V, and determines that there is no object in response to the output of 5V. The I/O unit 35 can transmit the result of determination of the presence or absence of an object, for example, to a personal computer (PC) or the like of an administrator. The administrator can consider countermeasures referring to the result transmitted to the PC or the like.

For example, when an object is a bait and a creature takes and eats the bait, the detection device 10 detects that the bait has disappeared and notifies the administrator of the result. In response to the reception of the notification, the administrator can know the presence of a creature in the vicinity of the detection device 10. Then, for example, the administrator can set a trap in the vicinity of the detection device 10 to exterminate the creature.

Figure 20:
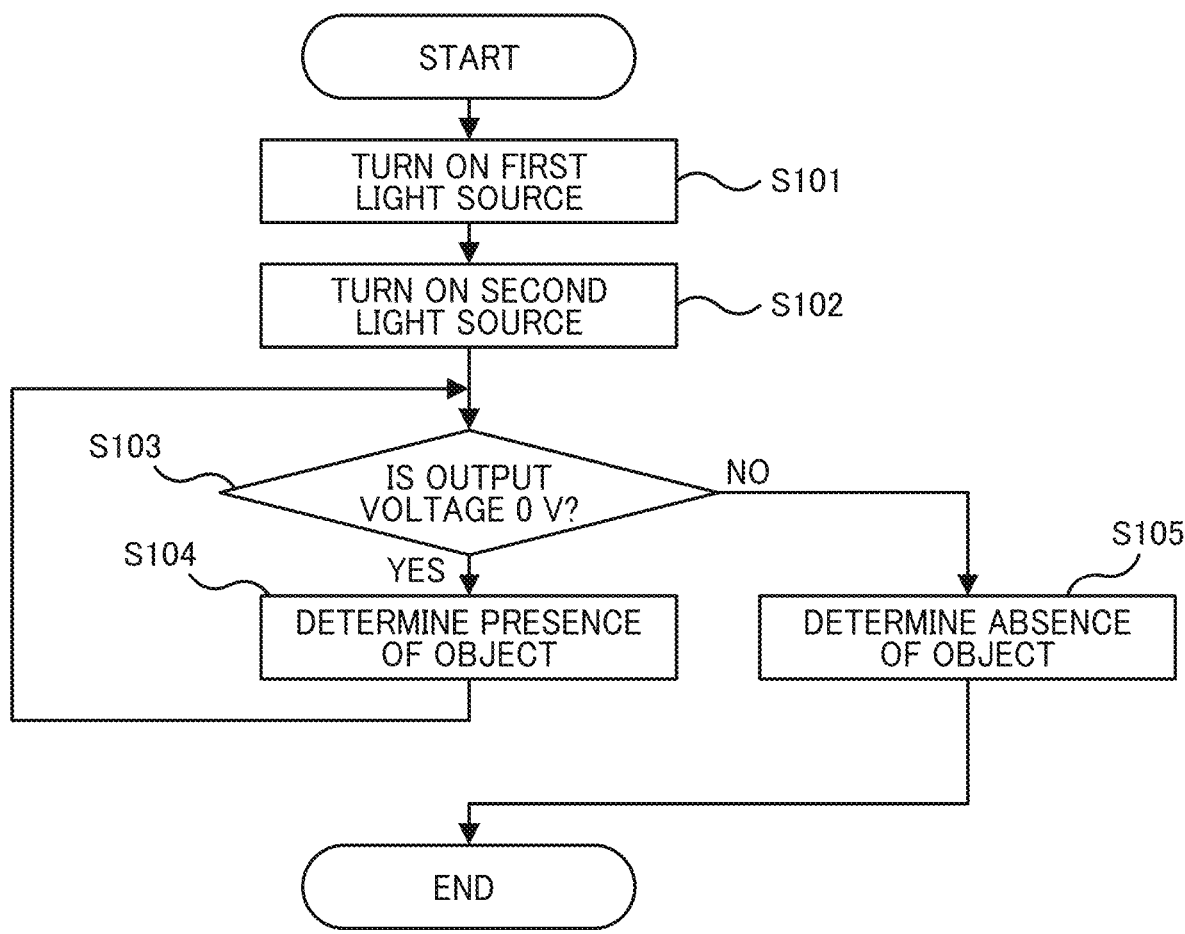
FIG. 20 is a flowchart illustrating an example of an operation of detecting an object performed by the detection device illustrated in FIG. 4 or 12.

FIG. 20 is a flowchart illustrating an example of an operation performed by the detection device 10 to detect an object. When the administrator turns on the power, the detection device 10 starts supplying power from the power supply unit 21 to the control board 20. After the administrator sets the object 39 on the transparent substrate 16, the detection device 10 starts the process from step 101.

In step 101, the operation control unit 36 controls the first light source 22 to emit infrared in a direction parallel to the surface of the control board 20. In step 102, the operation control unit 36 controls the second light source 23 to emit LED light in a direction different from the infrared emission direction. Although the first light source 22 is turned on first and then the second light source 23 is turned on in this example, the order of turning-on is not limited thereto. Alternatively, the second light source 23 may be turned on first, or both may be turned on at the same time. After the turning-on, the light-receiving device 26 receives the light reflected from the object 39.

In step 103, the operation control unit 36 determines whether or not the output voltage from the light-receiving device 26 is 0 V. Although whether the output voltage is 0 V is determined in this example, the output voltage is not always 0 V but may increase slightly due to a detection error. Therefore, a threshold may be set, and whether the output voltage is equal to or smaller than a threshold may be determined.

In response to a determination that the output voltage is 0 V in step 103 (Yes in S103), in step 104, the operation control unit 36 determines the presence of the object 39. Then, the process returns to step 103. On the other hand, in response to a determination that the output voltage is not 0 V but the given value (No in S103), in step 105, the operation control unit 36 determines the absence of the object 39. Then, the detection device 10 ends the operation in FIG. 20.

In the example illustrated in FIG. 20, the process is completed when the object 39 is not present. Alternatively, when the object 39 is a bait, another bait may be placed on the transparent substrate 16 and the detection operation may be executed. In such a case, a new bait may be placed on the transparent substrate 16 while emission of the infrared and the LED light (in steps 101 and 102) and reception of the reflected light are continued, so that the operation is started from step 103.

When the new bait is not taken away, it can be determined that the creature has moved. When the new bait is taken away, it can be determined that the creature stays in the vicinity or there are multiple creatures.

One detection device 10 may be used to detect the presence or absence of one object. In order to find the whereabouts of pests or vermin, a plurality of detection devices 10 can be installed so as to predict where the pests or vermin moves to next based on the place from which the bait disappears and time when the bait disappears, etc.

Figure 21:
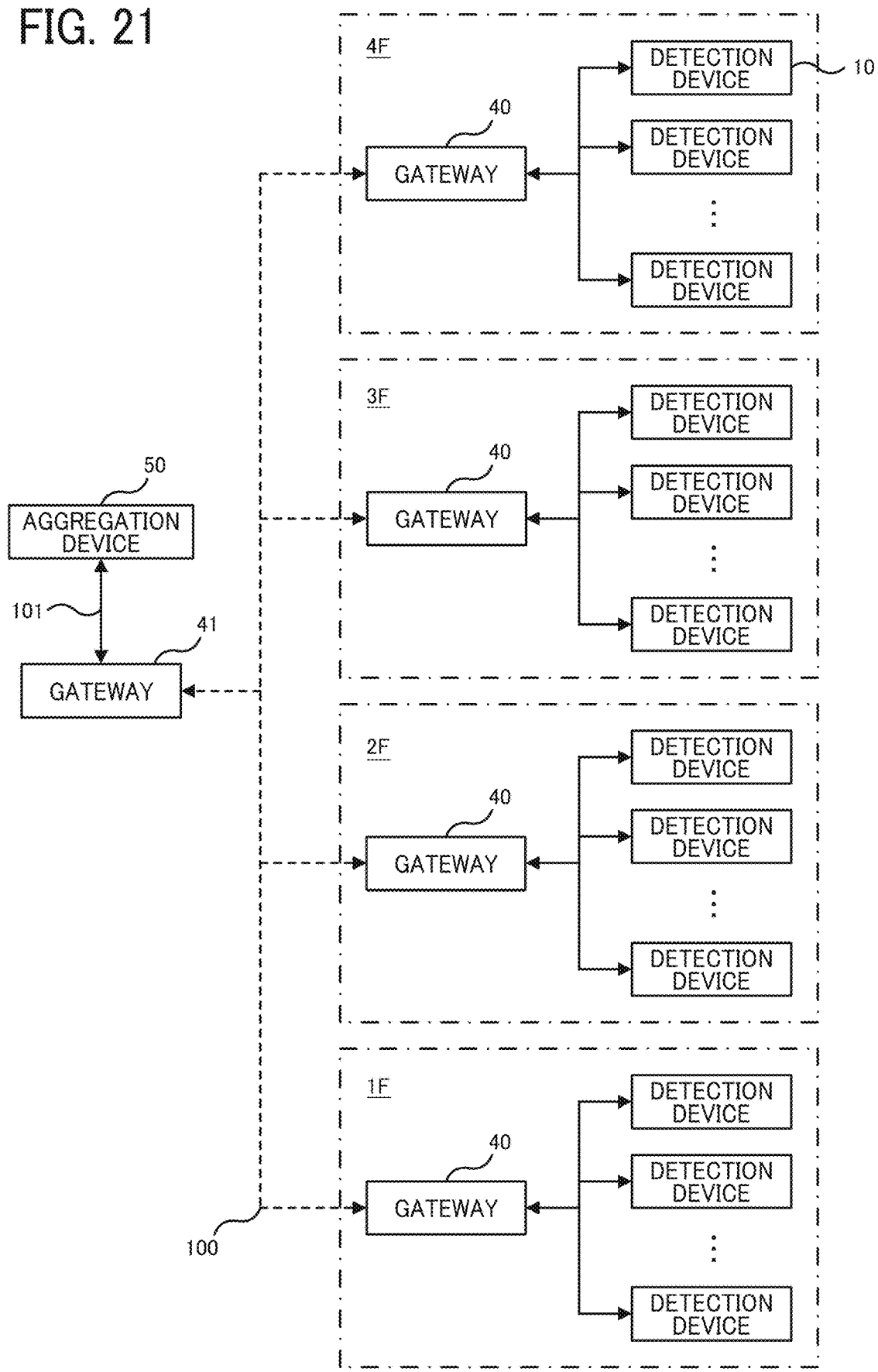
FIG. 21 is a diagram illustrating an example of a configuration of a detection system including the detection device illustrated in FIG. 4 or 12.

A description is given below of a detection system using a plurality of detection devices 10 described above. FIG. 21 is a block diagram illustrating an example of a configuration of the detection system according to the present embodiment. The detection system is installed, for example, in a building having a plurality of floors. A description is given below of an example of installing the detection system in a building, but the target to which the detection system is applied is not limited to the building. In the example illustrated in FIG. 21, the building is a four-story building.

The detection system includes a plurality of detection devices 10, a plurality of gateways 40 (information processing apparatuses), and an aggregation device 50 (information processing apparatus). A plurality of detection devices 10 is installed on each of the first floor to the fourth floor of the building. One gateway 40 is installed on each floor of the building. The detection device 10 on each floor performs wireless communication with the gateway 40 on that floor and transmits the detection result to the gateway 40. The gateway 40 on each floor is connected to a gateway 41 (information processing apparatus) connected to the aggregation device 50 via a network 100. The aggregation device 50 and the gateway 41 may be directly connected by a cable or may be connected via a network 101.

Examples of the networks 100 and 101 include the Internet, a wired local area network (LAN), and a wireless LAN. The gateway 40 on each floor and the gateway 41 may be connected via a wireless communication network such as a low-power wide-area (LPWA) network including a Long Range (LoRa) network. In this example, the aggregation device 50 and the plurality of detection devices 10 are connected via the plurality of gateways 40 and the gateway 41. Alternatively, when the plurality of detection devices 10 can communicate with the aggregation device 50 using the same protocol, the plurality of gateways 40 and the gateway 41 may be omitted. Yet alternatively, either the plurality of gateways 40 or the gateway 41 may be provided.

The gateway 41 communicates with the gateway 40 on each floor, collects the detection results acquired by the gateway 40 on each floor, and transmits the detection results to the aggregation device 50.

The aggregation device 50 aggregates and outputs the detection results acquired from the plurality of detection devices 10. The aggregation device 50 is a computer such as a PC, a smartphone, or a tablet terminal; or a server.

Figure 22:
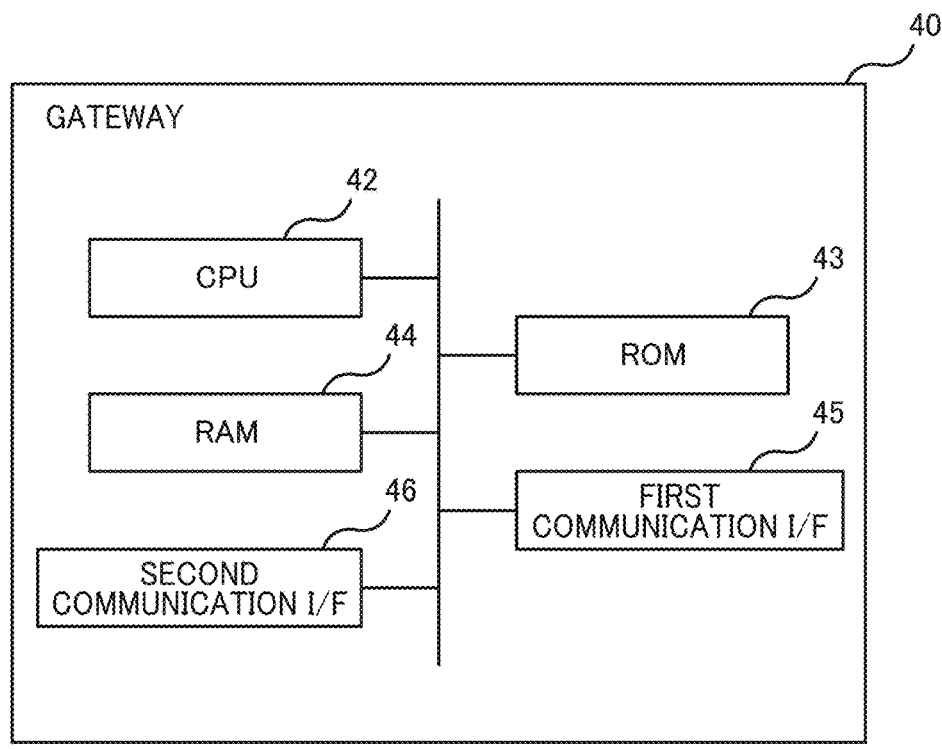
FIG. 22 is a block diagram illustrating an example of a hardware configuration of a gateway of the detection system illustrated in FIG. 21.

A description is given of hardware configurations of the gateways 40 and 41 with reference to FIG. 22. Since the gateways 40 and 41 have the same hardware configuration, only the gateway 40 is described.

The gateway 40 is a network node for connecting to a network having a different protocol. The hardware of the gateway 40 includes a CPU 42, a ROM 43, a RAM 44, a first communication interface (I/F) 45, and a second communication I/F 46. The ROM 43 stores a control program for controlling the gateway 40. The RAM 44 serves as a work area for the CPU 42. The CPU 42 controls the gateway 40 by reading the control program from the ROM 43, expanding the control program into the RAM 44, and executing the control program.

The first communication I/F 45 connects to the network 100 and communicates with the gateway 41 via the network 100. The second communication I/F 46 performs wireless communication with each detection device 10.

In this example, the CPU 42 controls the entire operation of the gateway 40 by executing the control program, but a part or all of the control may be implemented by a circuit or the like.

Figure 23:
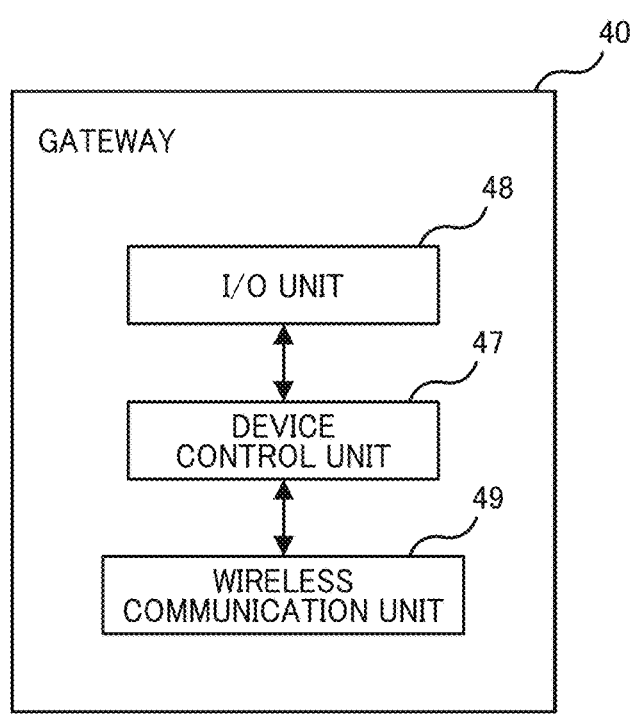
FIG. 23 is a block diagram illustrating an example of a functional configuration of the gateway of the detection system illustrated in FIG. 21.

FIG. 23 is a block diagram illustrating an example of a functional configuration of the gateway 40. Since the gateways 40 and 41 have the same functional configuration, only the gateway 40 is described.

The gateway 40 includes a device control unit 47, an I/O unit 48, and a wireless communication unit 49 as functional units. The device control unit 47 controls the entire operation of the gateway 40. The device control unit 47 controls relay of information and commands via the I/O unit 48 and the wireless communication unit 49. The I/O unit 48 connects to the network 100 and performs transmission and reception of information and commands to and from the gateway 41. The wireless communication unit 49 performs wireless communication with the plurality of detection devices 10 and receives the respective detection results from the plurality of detection devices 10.

Figure 24:
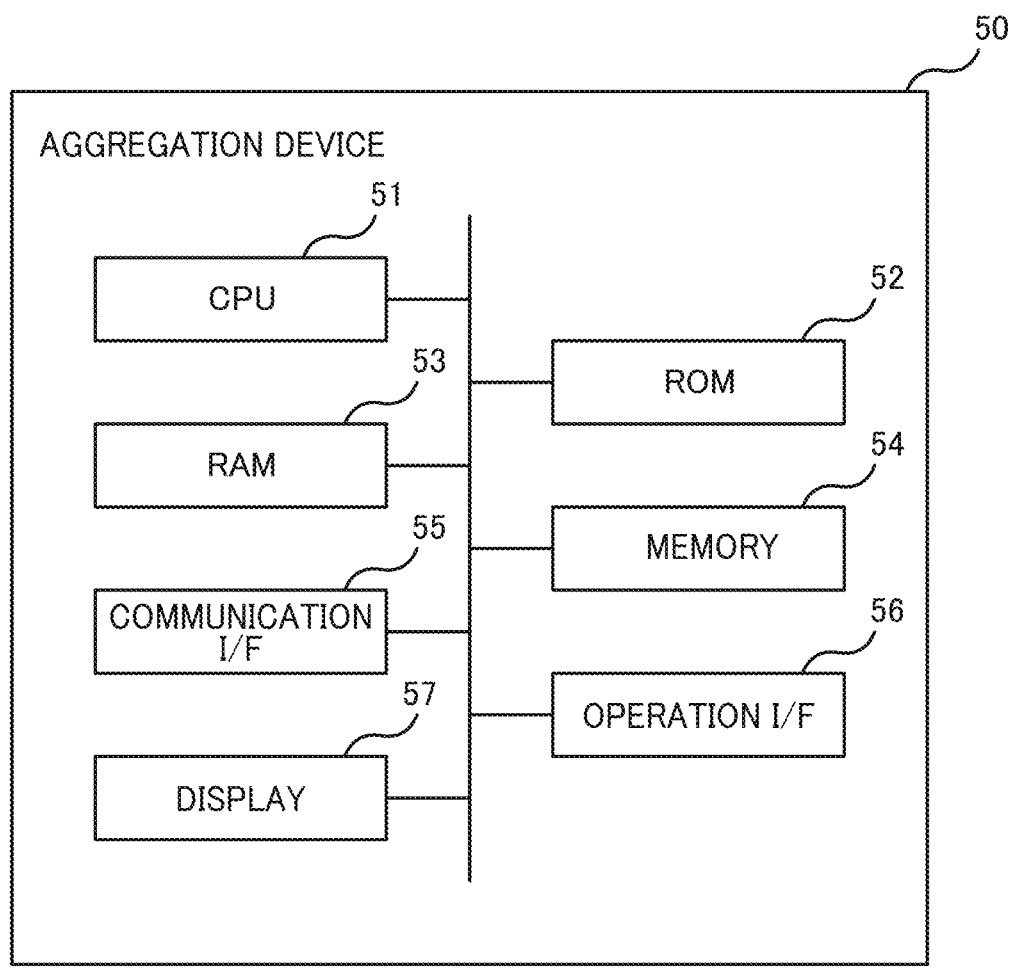
FIG. 24 is a block diagram illustrating an example of a hardware configuration of an aggregation device of the detection system illustrated in FIG. 21.

Next, the aggregation device 50 is described. FIG. 24 is a block diagram illustrating an example of a hardware configuration of the aggregation device 50. The aggregation device 50 includes a CPU 51, a ROM 52, a RAM 53, a memory 54, a communication I/F 55, an operation I/F 56, and a display 57 as hardware.

The ROM 52 stores a control program for controlling the aggregation device 50. The RAM 53 serves as a work area for the CPU 51. The CPU 51 controls the aggregation device 50 by reading the control program from the ROM 52, expanding the control program into the RAM 53, and executing the control program.

The memory 54 is, for example, a volatile or non-volatile semiconductor memory, an HDD, or an SSD, and functions as a storage area. The memory 54 may include the ROM 52 and the RAM 53.

The communication I/F 55 connects to the network 101 and communicates with the gateway 41 via the network 101. The operation IX 56 may include an input device such as a button, a dial, a key, a touch panel, a microphone for voice input, and a camera for image input.

The display 57 can be, for example, a liquid crystal panel, an organic electro luminescence (EL), an inorganic EL, or an electronic paper display, or a touch panel having the function of the operation I/F 56. The display 57 may include an audio output device (e.g., a speaker) for outputting audio.

In this example, the CPU 51 controls the entire operation of the aggregation device 50 by executing the control program, but a part or all of the control may be implemented by a circuit or the like.

Figure 25:
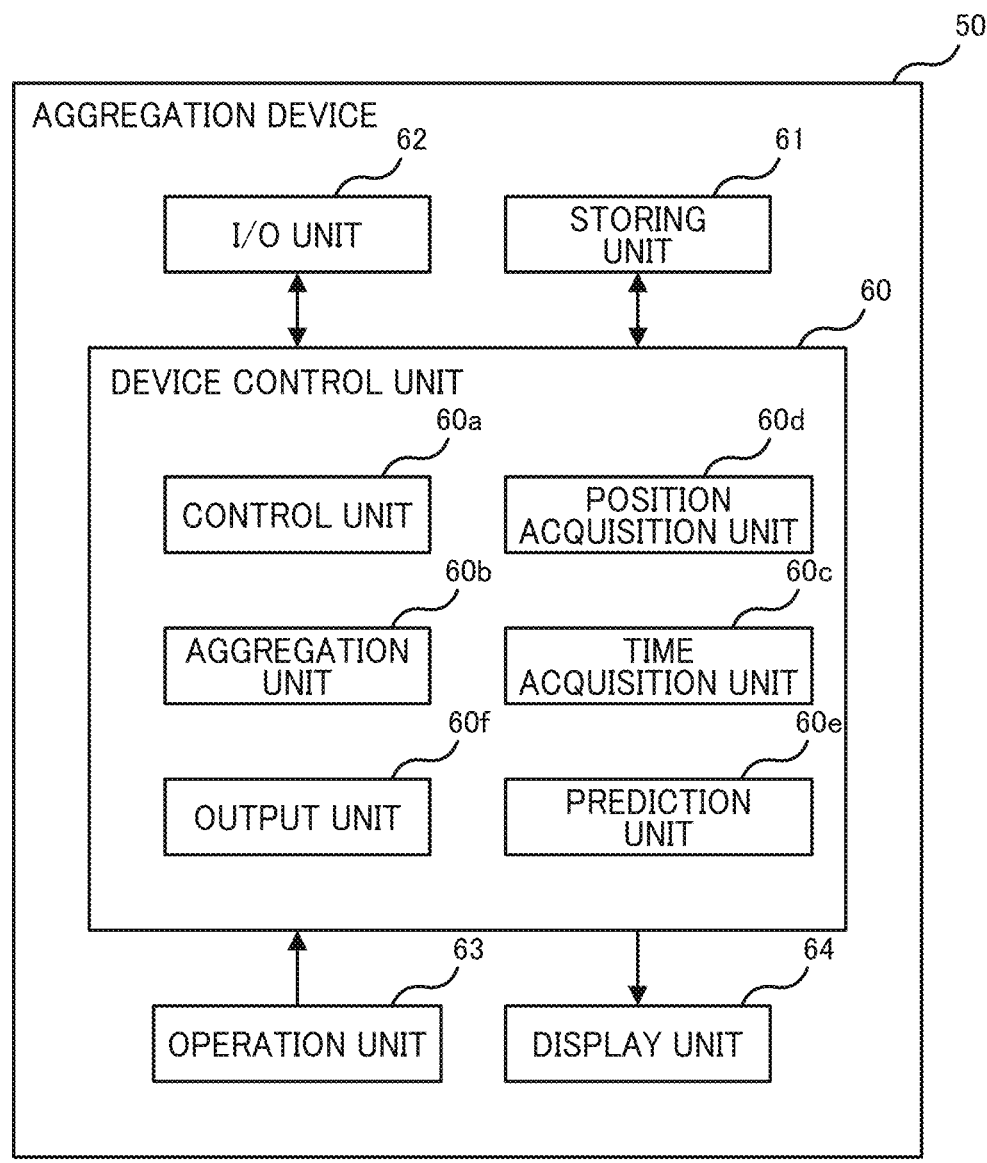
FIG. 25 is a block diagram illustrating an example of a functional configuration of the aggregation device of the detection system illustrated in FIG. 21.

FIG. 25 is a block diagram illustrating an example of a functional configuration of the aggregation device 50. The aggregation device 50 includes a device control unit 60, a storing unit 61, an I/O unit 62, an operation unit 63, and a display unit 64 as functional units. The device control unit 60 includes a control unit 60*a*, an aggregation unit 60*b*, a time acquisition unit 60*c*, a position acquisition unit 60*d*, a prediction unit 60*e*, and an output unit 60*f*.

The storing unit 61 stores various information. Examples of the information stored by the storing unit 61 include information of the positions of the plurality of detection devices 10 installed in the building. For example, a floor map or a layout map of each floor can be used to indicate the positions.

The I/O unit 62 is connected to the gateway 41 via the network 101, and performs transmission and reception of information and commands to and from the gateway 41. The operation unit 63 receives an operation input from a user of the system and outputs information (data), a command, or the like input by the user to the device control unit 60. The display unit 64 displays data output from the device control unit 60. The display unit 64 may also function as an audio output unit to output audio data output from the device control unit 60.

The control unit 60*a* of the device control unit 60 controls the overall operation of the aggregation device 50. The control unit 60*a* acquires the detection result from each detection device 10 via the I/O unit 62. At that time, the control unit 60*a* also acquires identification information (device ID) each identifying the detection device 10. The control unit 60*a* outputs such information to the aggregation unit 60*b*.

The time acquisition unit 60*c* acquires time information. The time acquisition unit 60*c* measures time and acquires the time at which the detection result is acquired from each detection device 10. Alternatively, each detection device 10 may measure time, and the time acquisition unit 60*c* may acquire the information on the time from each detection device 10. The control unit 60*a* outputs the acquired time information to the aggregation unit 60*b* in association with the above information.

The position acquisition unit 60*d* acquires the device ID from each detection device 10, and refers to association information associating the device ID registered in advance in the storing unit 61 with the floor map. Then, the position acquisition unit 60*d* acquires the position information of each detection device 10. The position acquisition unit 60*d* outputs the acquired position information to the prediction unit 60*e* and the aggregation unit 60*b*.

The prediction unit 60*e* predicts the movement of pests or vermin that carry the object based on the result that the object has disappeared among the detection results acquired from the plurality of detection devices 10, and outputs the prediction to the aggregation unit 60*b*. For example, the prediction unit 60*e* may perform prediction using a vector including the detection results of all the detection devices 10 as elements.

Figure 26:
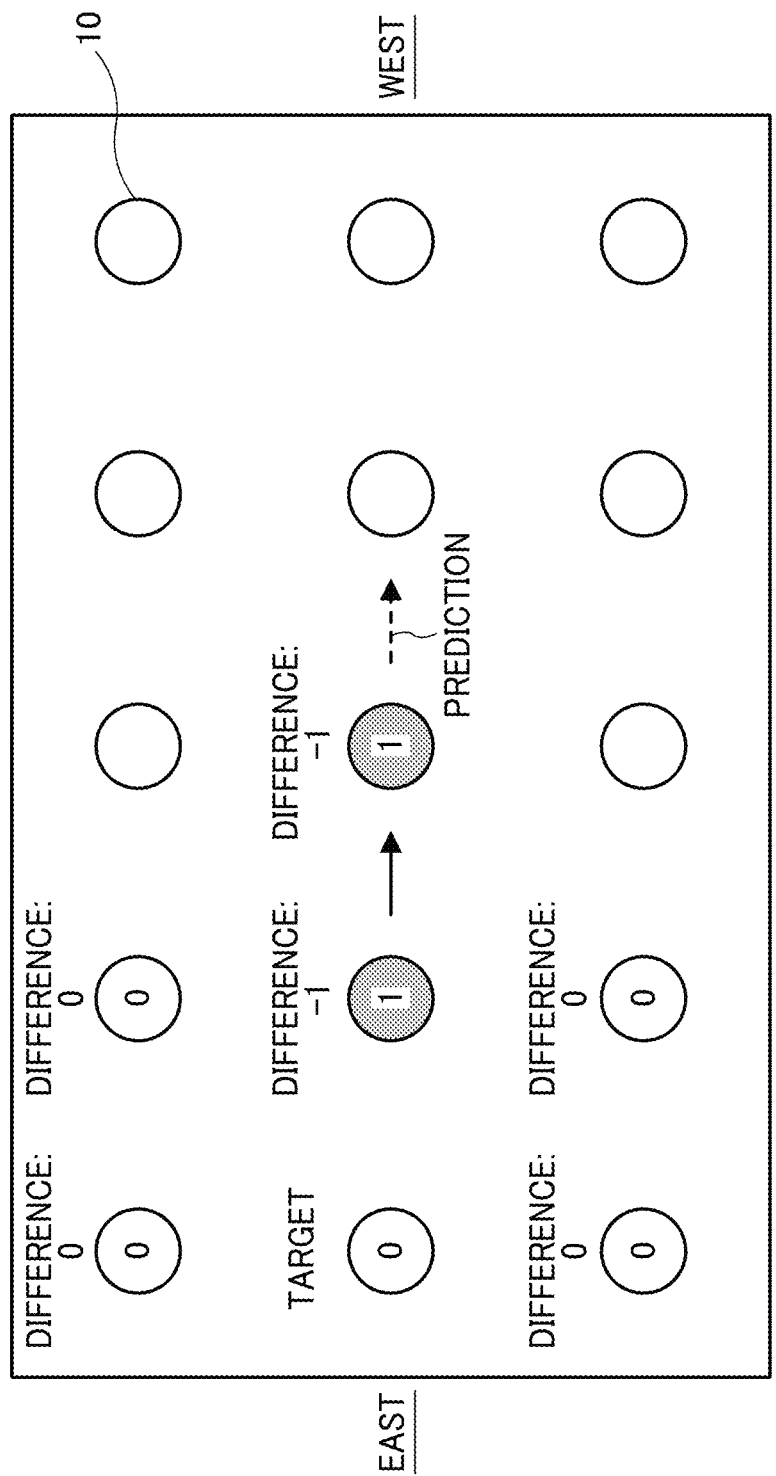
FIG. 26 is a diagram illustrating an example of a method of predicting a movement direction of an object.

For example, the non-detection state (initial state) is represented by a vector element "0", and the detection state is represented by a vector element "1". The prediction unit 60*e* acquires the detection state of the target detection device 10 as "0" or "1", and acquires the difference in detection state between the target detection device 10 and each of the detection devices 10 surrounding the target detection device 10. For example, as illustrated in FIG. 26, in a case where the detection state of the target detection device 10 is "0", and the detection state of the detection device 10 adjacent on the west of the target detection device 10 according to the position information is "1", the difference is acquired as "0−1=−1". Further, when the detection state of the detection device 10 on further west of the detection device 10 adjacent on the west is "1" and the acquired difference is "−1", the prediction unit 60*e* can predict that the object will move toward the west from the target detection device 10. That is, the prediction unit 60*e* can predict that the direction to the west from the target detection device 10 is the moving direction of the object.

Consider a case where the target detection device 10 is at an end inside the building. In this case, the prediction unit 60*e* can perform prediction assuming that a detection device 10 is present outside the building even when no detection device 10 is present outside the building. Specifically, consider a case where the detection state of the detection device 10 at the end inside the building is "1" and the difference is "−1", the surrounding detection devices 10 in the directions other than the direction to the outside of the building have the detection states "0." In this case, the prediction unit 60*e* can assume that the detection state of the detection device 10 outside the building is "1" and the difference is "−1." Then, the prediction unit 60*e* can predict that the object will move in the direction from the detection device 10 at the end inside the building to the outside of the building. Such a prediction method is an example. The prediction method is not limited thereto, and any known method can be adopted.

The aggregation unit 60*b* aggregates information acquired from the control unit 60*a*, the time acquisition unit 60*c*, the position acquisition unit 60*d*, and the prediction unit 60*e*, and outputs aggregated data to the output unit 60*f* and the storing unit 61. The aggregation unit 60*b* can aggregate the device IDs, the detection results, the position information, and the time information, and generate the aggregated data as illustrated in FIG. 27. From the time information and the position information of the detection "present," it can be known that the object moves from the north side of the first floor to the south side of the second floor, and then moves directly above to the south side of the third floor.

Figure 28:
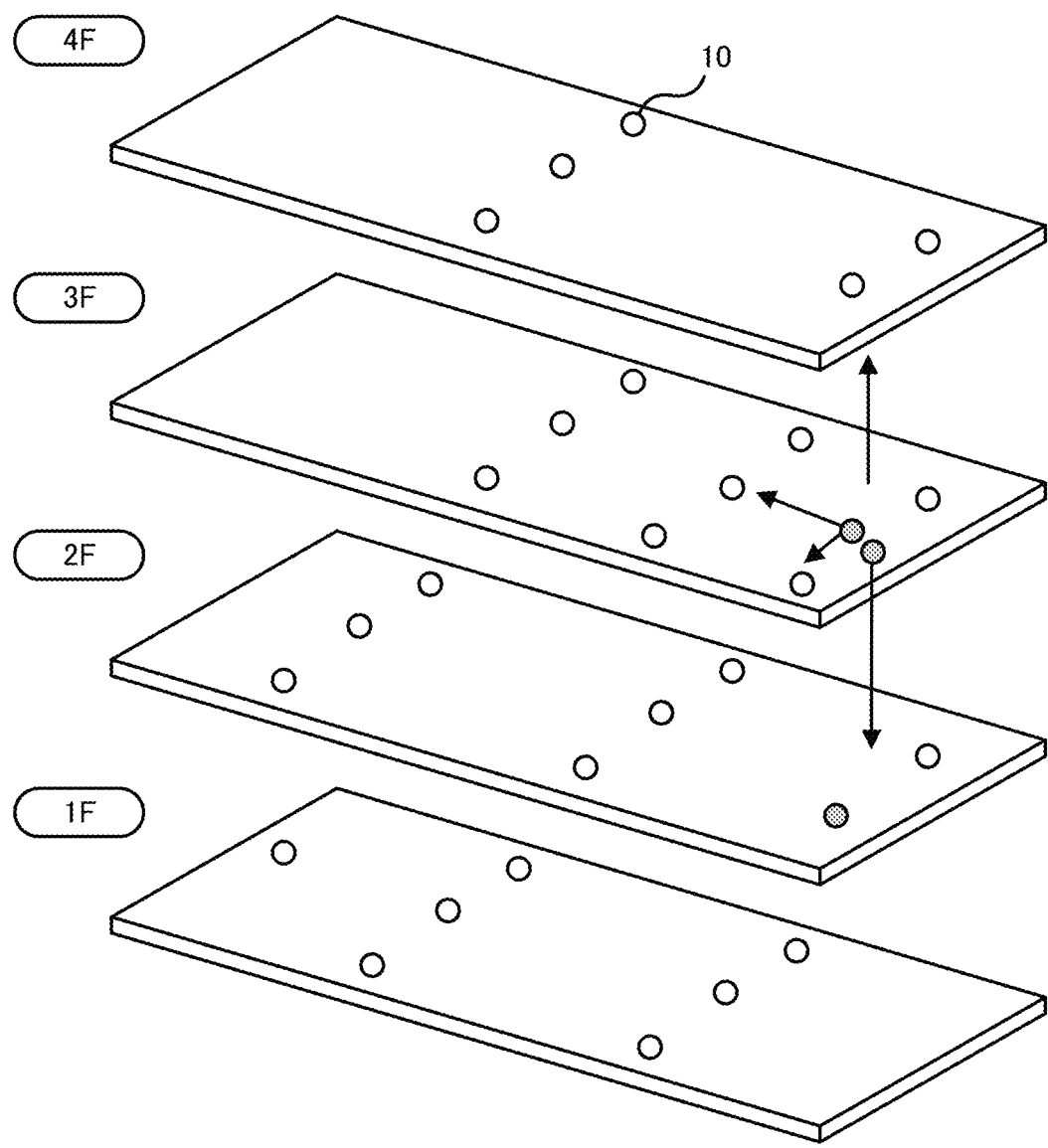
FIG. 28 illustrates another example of aggregated data.

The aggregation unit 60*b* may generate aggregated data using the floor map as illustrated in FIG. 28 in addition to, or instead of, the aggregated data in the table format in FIG. 27. In FIG. 28, the aggregated data indicates the respective positions of the plurality of detection devices 10 on the floor map of each floor of the building, the detection results, and the predicted movement direction of the object. In FIG. 28, the detection results are indicated by circles. White circles indicate "no detection," and colored circles indicate "detection present."

The output unit 60f outputs the aggregated data acquired from the aggregation unit 60b to the display unit 64 or the like as text data, image data, voice data, or the like.

The detection system including the plurality of detection devices 10, the gateways 40 and 41, and the aggregation device 50 can output the aggregated information in which the detection results of the detection devices 10 at different positions are aggregated. Since each detection device 10 can reliably detect an object, erroneous detections can be reduced, thereby improving the accuracy of the aggregated information.

The detection system does not have to include the prediction unit 60e, but the prediction unit 60e provides the following advantage. When the object to be detected is a movable creature, the movement direction of the creature can be estimated based on the prediction result generated by the prediction unit 60e. This helps to take measures against the creature.

The aggregation device 50 used in the detection system may use a computer or a server, but may include both of a computer and a server. Alternatively, not limited to these two devices, the aggregation device 50 may include three or more devices.

Figure 29:
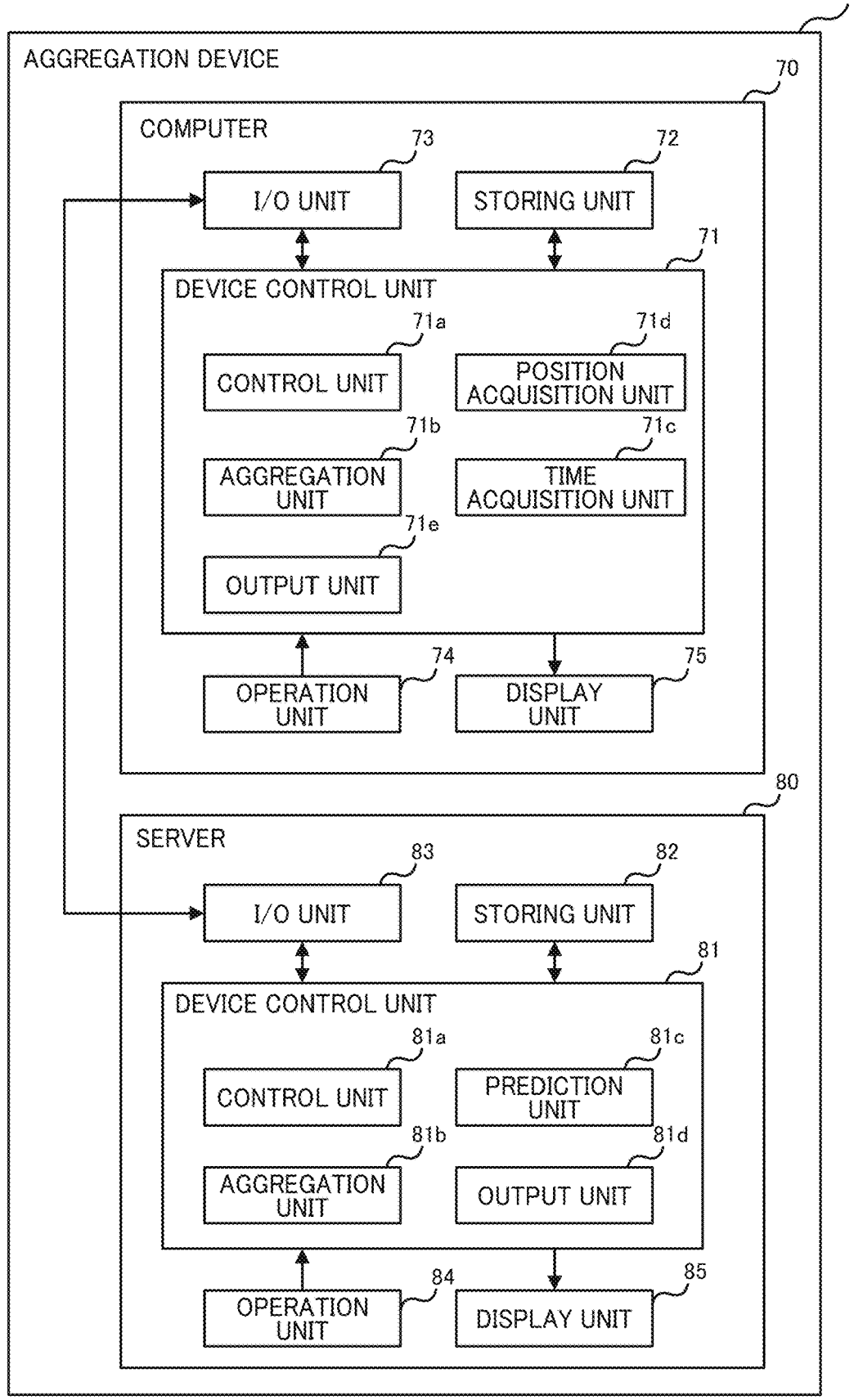
FIG. 29 is a block diagram illustrating another example of the functional configuration of the aggregation device of the detection system illustrated in FIG. 21.

FIG. 29 is a block diagram illustrating an example of the configuration of the aggregation device 50 including a computer 70 (a terminal) and a server 80. The computer 70 includes a device control unit 71, a storing unit 72, an I/O unit 73, an operation unit 74, and a display unit 75. The device control unit 71 includes a control unit 71a, an aggregation unit 71b, a time acquisition unit 71c, a position acquisition unit 71d, and an output unit 71e. The function of each component of the computer 70 is the same as that of the corresponding component of the aggregation device 50 illustrated in FIG. 24.

The I/O unit 73 is connected to the server 80 via a network, and performs transmission and reception of information, commands, and the like to and from the server 80. The output unit 71e outputs the aggregated data acquired from the aggregation unit 71b to the display unit 75 and the server 80.

The server 80 includes a device control unit 81, a storing unit 82, an I/O unit 83, an operation unit 84, and a display unit 85. The device control unit 81 includes a control unit 81a, an aggregation unit 81b, a prediction unit 81c, and an output unit 81d. The function of each component of the server 80 is the same as that of the corresponding component of the aggregation device 50 illustrated in FIG. 24. The prediction unit 81c predicts the movement of the object based on the detection by each detection device 10 using the information acquired from the computer 70. The aggregation unit 81b aggregates the information acquired from the computer 70 and the prediction result of the prediction unit 81c, and outputs the aggregated data to the output unit 81d. The output unit 81d outputs the aggregated data generated by the aggregation unit 81b to the display unit 85 or the like.

In the detection device 10, the second light source 23 is used to increase the light intensity of infrared emitted from the first light source 22. However, the second light source 23 may be used, in addition to increasing the light intensity of infrared, for an initialization checking operation of the detection device 10 or the like. Specifically, when the power of the detection device 10 is turned on, the second light source 23 is turned on for a certain period of time to check the power supply state. Next, only the first light source 22 is turned on. While the first light source 22 is on, the second light source 23 is turned on and off. At this time, the detection device 10 does not detect an object because no object is present on the transparent substrate of the window 13. The detection device 10 sets the result of the light-receiving device 26 at this time as an initial state.

With the initial state thus set, the presence or absence of an object can be detected by detecting whether the initial state continues or whether there is a change from the initial state. Therefore, there is no need of keeping the first light source 22 and the second light source 23 on. The first light source 22 and the second light source 23 can be turned on, for example, at predetermined time intervals, and can be turned off immediately after the presence or absence of an object is confirmed. Such an operation can save the energy of the detection device 10.

So far, the descriptions have been given of the detection device, the detection system, and the detection method according to the embodiments of the present disclosure. However, the present invention is not limited to the above-described embodiments, and other embodiments, addition of elements, deletion of elements are possible in within the range conceivable by those skilled in the art. For example, elements and/or features of different illustrative embodiments may be combined with each other and/or substituted for each other within the scope of the present disclosure. Any embodiment that provides a function and an effect of the present disclosure is within the scope of the present disclosure.

Therefore, the scope of the present disclosure includes a computer program for implementing each function of the control unit, a computer-readable recording medium storing the computer program, another server that stores the computer program and is configured to provide the computer program in response to a download request, and the like.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A detection device configured to detect an object, the detection device comprising:
   a first light source configured to emit infrared as first light in a first direction;
   a second light source configured to emit second light in a second direction different from the first direction, the second light different from the first light;
   a shield disposed to shield a portion of an optical path from the second light source, to allow a portion of the second light to pass;
   a light receiving detector to detect the first light reflected from the object without the first light being shielded from the detector by the shield and to detect the portion of the second light reflected from the object; and
   circuitry configured to detect presence or absence of the object based on reception of reflected light by the detector.

2. The detection device according to claim 1, further comprising a board inclined with respect to a vertical direction, the board including:
   a first face on which the first light source and the second light source are disposed; and a second face opposite the first face, the second face on which the detector is disposed.

3. The detection device according to claim 2, further comprising:
   a container configured to accommodate the board;
   a container cover configured to cover an upper side of the container, the container cover including a window disposed to be partly coverable with the shield; and
   a transparent member covering the window,
   wherein the object is disposed on the transparent member.

4. The detection device according to claim 3,
   wherein the transparent member is a flat plate made of vinyl chloride resin.

5. The detection device according to claim 3,
   wherein the container includes a first inner face that is black, and
   wherein the container cover includes a second inner face that is black, the second inner face facing an inside of the container and surrounding the window.

6. The detection device according to claim 3, further comprising a lid attached to the container and configured to open and close the upper side of the container,
   the lid including a bottom face that is black, the bottom face facing an inside of the container when the lid closes the upper side of the container, the lid configured to be secured at an open position with the upper side of the container being open.

7. The detection device according to claim 1, further comprising:
   a memory configured to store identification information identifying the detection device; and
   a communication circuit configured to transmit a detection result of the detector and the identification information stored in the memory.

8. A method for detecting an object, the method comprising:
   emitting, as first light, infrared in a first direction;
   emitting second light in a second direction different from the first direction, the second light different from the first light;
   shielding a part of the second light, to allow a portion of the second light to pass;
   receiving the first light reflected from the object without the first light being shielded and the portion of the second light reflected from the object; and
   detecting presence or absence of the object based on reception of reflected light from the object.

9. A detection device configured to detect an object, the detection device comprising:
   a first light source configured to emit infrared as first light in a first direction;
   a second light source configured to emit second light in a second direction different from the first direction, the second light different from the first light;
   a shield disposed to shield a portion of an optical path from the second light source, to allow a portion of the second light to pass;
   a light receiving detector configured to detect the first light reflected from the object and the portion of the second light reflected from the object;
   circuitry configured to detect presence or absence of the object based on reception of reflected light by the detector; and
   a board inclined with respect to a vertical direction, the board including:
      a first face on which the first light source and the second light source are disposed; and
      a second face opposite the first face, the second face on which the detector is disposed.

\* \* \* \* \*